(12) United States Patent
Starley

(10) Patent No.: US 12,384,549 B2
(45) Date of Patent: Aug. 12, 2025

(54) INNER COWL ARRANGEMENT FOR GAS TURBINE ENGINE

(71) Applicant: ROLLS-ROYCE PLC, London (GB)

(72) Inventor: James G Starley, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 18/378,339

(22) Filed: Oct. 10, 2023

(65) Prior Publication Data

US 2024/0150029 A1 May 9, 2024

(30) Foreign Application Priority Data

Nov. 3, 2022 (GB) ..................................... 2216343

(51) Int. Cl.
*B64D 29/06* (2006.01)
*B64D 27/12* (2006.01)
*F02C 7/04* (2006.01)

(52) U.S. Cl.
CPC ............. *B64D 29/06* (2013.01); *B64D 27/12* (2013.01); *F02C 7/04* (2013.01)

(58) Field of Classification Search
CPC ........... B64D 29/06; B64C 7/02; F01D 25/24; F01D 25/26; F01D 25/265; F01D 25/28; F02K 1/78; F02K 1/80; F02K 1/805; F02K 1/82; E05B 51/023; E05B 65/102; E05B 65/1026; E05B 17/0054; E05B 17/0062; E05B 17/0066; E05B 39/02; E05B 39/025

See application file for complete search history.

(56) References Cited

U.S. PATENT DOCUMENTS

| | | | | |
|---|---|---|---|---|
| 4,549,708 A | * | 10/1985 | Norris | B64D 29/06 |
| | | | | 292/28 |
| 7,143,877 B2 | * | 12/2006 | Dusserre-Telmon | F16C 7/06 |
| | | | | 188/374 |
| 9,120,577 B1 | | 9/2015 | Baic | |
| 9,963,237 B2 | * | 5/2018 | Pretty | E05B 17/0062 |
| 10,837,320 B2 | * | 11/2020 | Subbarayachar | F01D 25/164 |
| 11,028,782 B2 | | 6/2021 | Ruston et al. | |
| 2015/0308168 A1 | | 10/2015 | Pretty | |

OTHER PUBLICATIONS

Mar. 18, 2024 extended Search Report issued in European Patent Application No. 23201343.3.
Apr. 12, 2023 Search Report issued in British Patent Application No. 2216343.0.

* cited by examiner

*Primary Examiner* — Devon C Kramer
*Assistant Examiner* — Sean V Meiller
(74) *Attorney, Agent, or Firm* — Oliff PLC

(57) ABSTRACT

An inner cowl arrangement for a gas turbine engine includes a first hinge and a second hinge pivotally connecting a first cowl member and a second cowl member, respectively, to a mounting structure. The inner cowl arrangement further includes a latch detachably securing the first and second cowl members. At least one of the first hinge, the second hinge, and the latch includes a pressure relief component that deforms or breaks when an applied load on the pressure relief component due to a pressure within an engine core is greater a normal operating load, causing at least one of the first cowl member and the second cowl member to move relative to the engine core, and forming an opening.

14 Claims, 17 Drawing Sheets

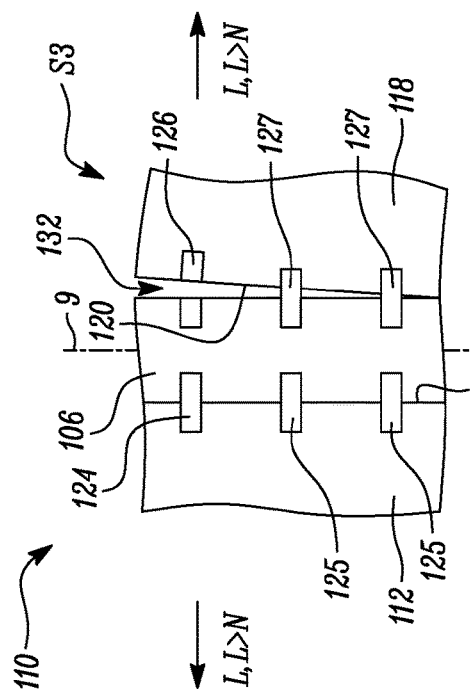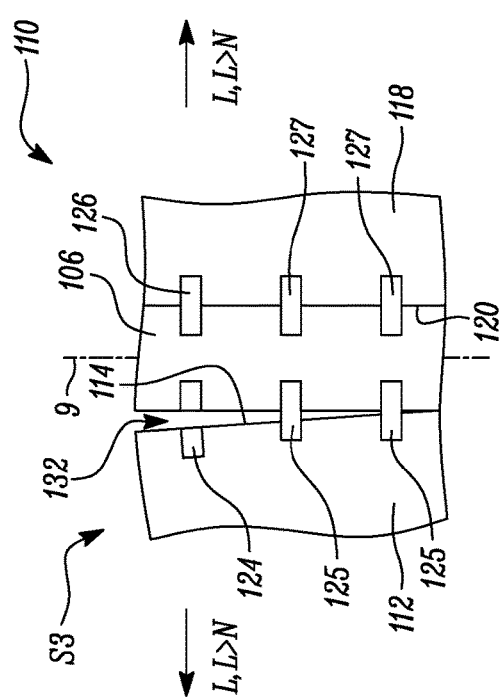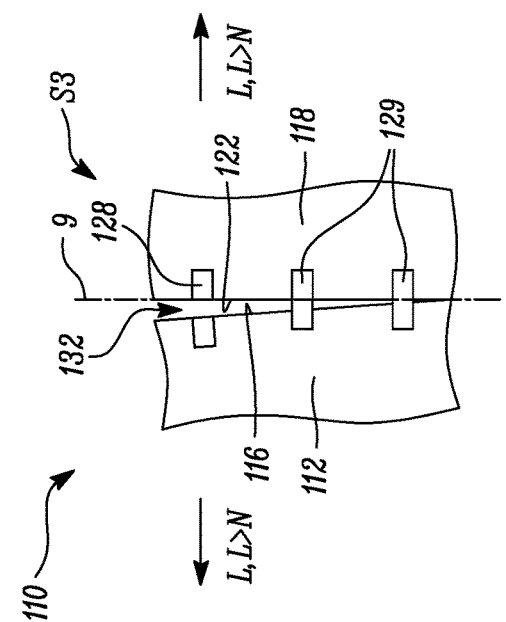
FIG. 5A
FIG. 5B
FIG. 5C

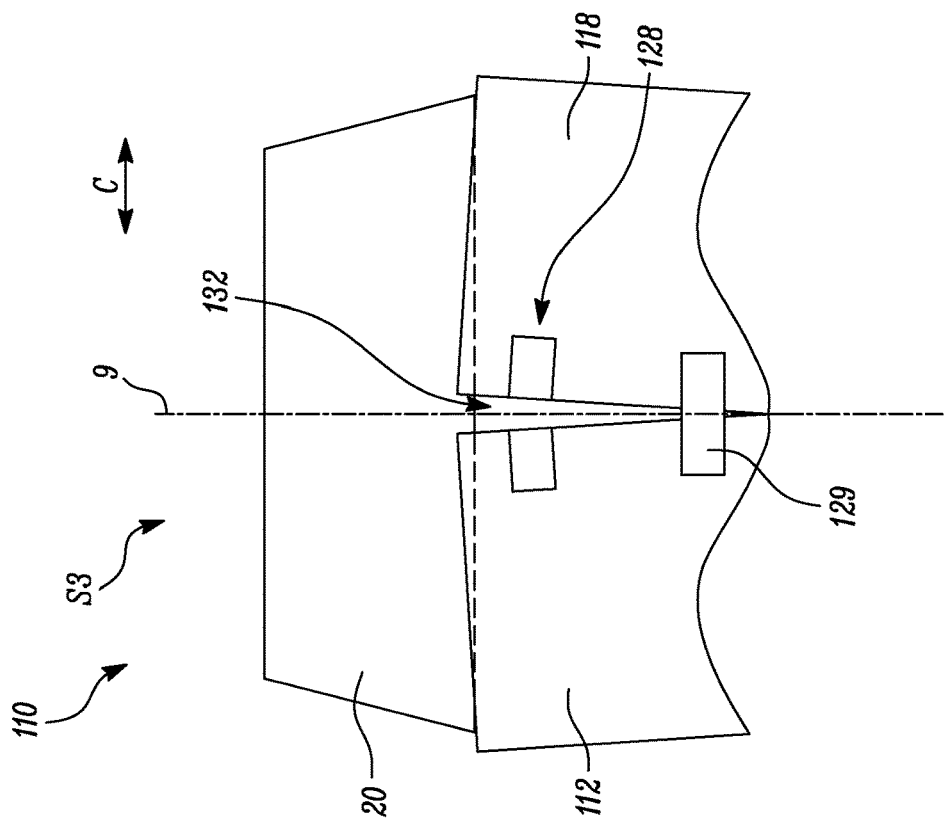
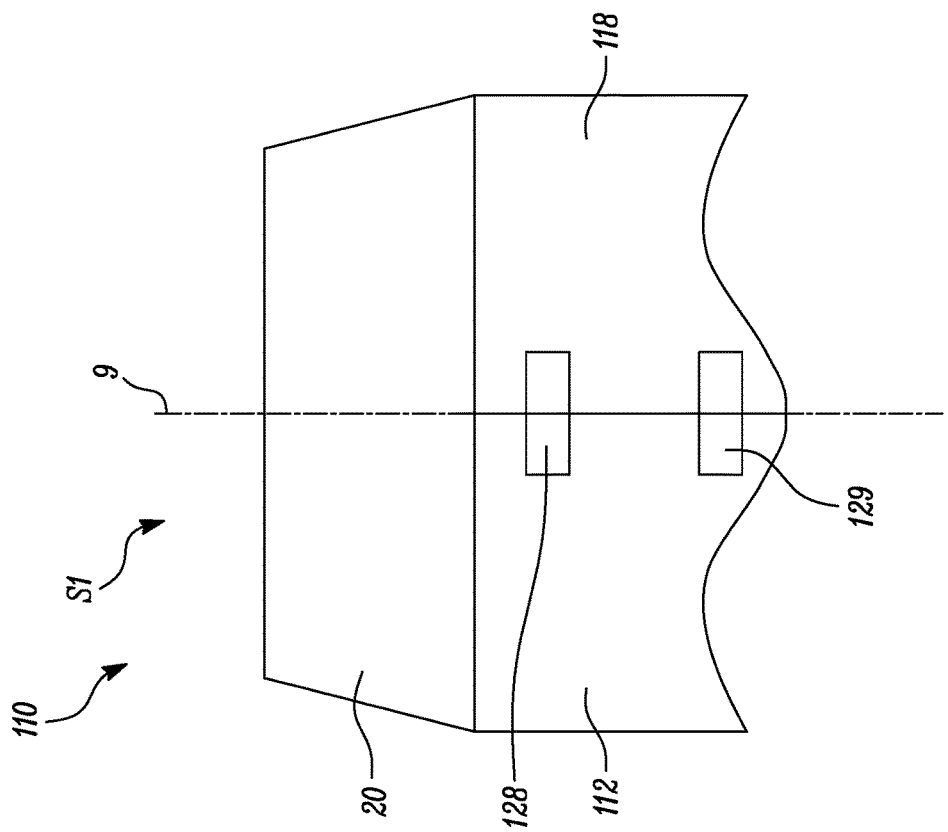

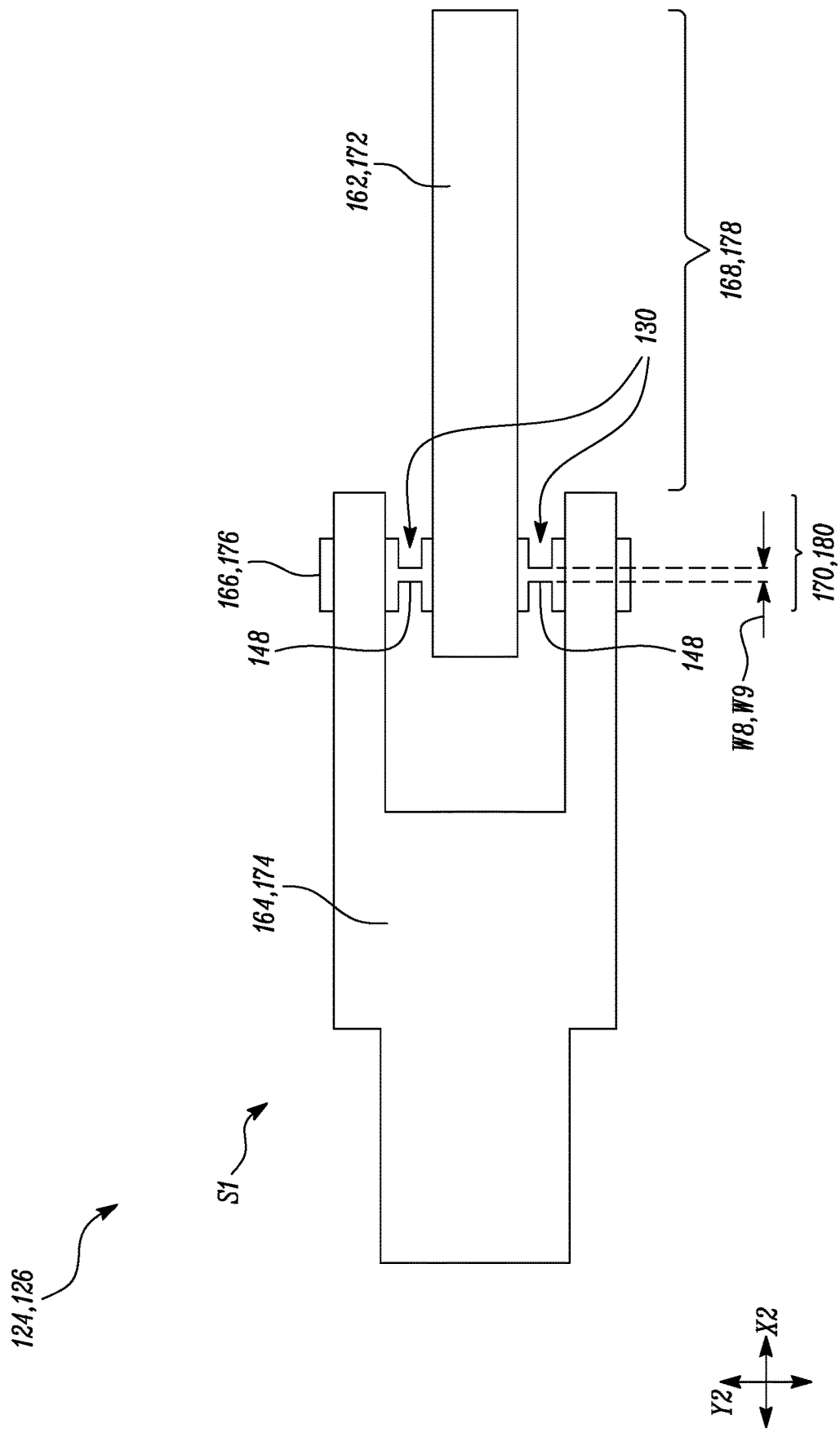

INNER COWL ARRANGEMENT FOR GAS TURBINE ENGINE

This specification is based upon and claims the benefit of priority from UK Patent Application Number 2216343.0 filed on 3 Nov. 2022, the entire contents of which are incorporated herein by reference.

BACKGROUND

Field of the Disclosure

The present disclosure generally relates to an inner cowl arrangement for a gas turbine engine.

Background of the Disclosure

Nacelles and core fairings of gas turbine engines are required to survive a burst duct event (e.g., due to duct rupture) in service. During the burst duct event, high pressure and high temperature air is released which increases a pressure inside the nacelles and the core fairings. This may cause damage to the nacelles and/or the core fairings. Conventionally, pressure relief systems are installed in gas turbine engine structures to relieve over-pressure due to the burst duct event. The pressure relief systems usually include latched doors that are triggered open under a given pressure differential, thereby discharging the high pressure and high temperature air to relive the over-pressure. However, these latched doors are heavy and difficult to integrate with the nacelles and the core fairings. Other pressure relief systems typically include utilising flexibility of a material of the nacelles and the core fairings to deform and vent the high pressure and high temperature air. As the nacelle architectures are evolving and utilising new materials and structures, the current pressure relief systems are difficult to integrate. For example, current nacelle architectures on large gas turbine engines may include separate inner and outer cowls. The inner cowls are typically stiffer than the outer cowls. Thus, the inner cowl may not easily deform and vent the over-pressure.

SUMMARY OF THE DISCLOSURE

According to a first aspect, there is provided an inner cowl arrangement for a gas turbine engine having an engine core. The inner cowl arrangement surrounds the engine core and is attached to a mounting structure. The inner cowl arrangement includes a first cowl member including a first upper edge and a first lower edge. The inner cowl arrangement further includes a first hinge pivotally connecting the first cowl member to the mounting structure proximal to the first upper edge. The inner cowl arrangement further includes a second cowl member opposing the first cowl member and including a second upper edge and a second lower edge. The inner cowl arrangement further includes a second hinge pivotally connecting the second cowl member to the mounting structure proximal to the second upper edge. The inner cowl arrangement further includes a latch detachably securing the first lower edge of the first cowl member to the second lower edge of the second cowl member. At least one of the first hinge, the second hinge, and the latch includes at least one pressure relief component configured to receive an applied load due to a pressure within the engine core. In a normal mode, the applied load on the at least one pressure relief component is less than or equal to a normal operating load, and the first cowl member and the second cowl member together retain the pressure within the engine core. In a failure mode, when the applied load on the at least one pressure relief component is greater the normal operating load, the at least one pressure relief component at least partially deforms or breaks to cause at least one of the first cowl member and the second cowl member to move relative to the engine core. A movement of the at least one of the first cowl member and the second cowl member relative to the engine core forms at least one opening to relieve at least a portion of the pressure from the engine core.

As the at least one pressure relief component at least partially deforms or breaks to cause at least one of the first cowl member and the second cowl member to move relative to the engine core and form the at least one opening, the pressure within the engine core may be easily relieved during the failure mode (e.g., a burst duct event during the operation of the gas turbine engine). This may reduce a pressure peak occurring just after the burst duct event. This may further provide pressure stabilization inside a nacelle of the gas turbine engine after the burst duct event. Thus, the inner cowl arrangement of the present disclosure may relieve over-pressure within the engine core during the burst duct event.

The first hinge or the second hinge may be a foremost or a rearmost hinge that connects the respective first cowl member and the second cowl member to the mounting structure. Similarly, the latch may be a foremost or a rearmost latch that secures the first cowl member to the second cowl member. Thus, other hinges that connect the respective first cowl member and the second cowl member to the mounting structure or other latches that secure the first cowl member to the second cowl member may remain intact during the burst duct event. This may ensure a structural integrity of the inner cowl arrangement of the gas turbine engine. Additionally, the deformation or breakage of the at least one pressure relief component may be visually detected during inspection or maintenance of the gas turbine engine, thereby indicating occurrence of the burst duct event after the operation of the gas turbine engine.

The inner cowl arrangement of the present disclosure may further eliminate the need for conventional latched doors to be integrated into the gas turbine engine. Thus, the proposed solution may be lighter than the conventional pressure relief arrangements and may also facilitate integration into the gas turbine engine as compared to the conventional pressure relief arrangements. Further, the at least one pressure relief component of the present disclosure may allow use of stiffer or stronger materials for the inner cowl arrangement of the gas turbine engine. Additionally, the inner cowl arrangement may allow use of separate inner and outer cowl arrangements. Therefore, the inner cowl arrangement may allow improved management of the pressures within the engine core resulting from the burst duct event for future gas turbine engine architectures.

In some embodiments, the latch includes a latch body fixedly connected to one of the first cowl member and the second cowl member. In some embodiments, the latch further includes a latch keeper fixedly connected to the other of the first cowl member and the second cowl member. The latch keeper removably engages with the latch body to detachably secure the first cowl member to the second cowl member. At least one of the latch body and the latch keeper includes the at least one pressure relief component. In the failure mode, the at least one pressure relief component at least partially deforms or breaks to cause the first cowl member to detach from the second cowl member, thereby forming the at least one opening between the first cowl member and the second cowl member. Thus, in the failure mode, the latch may relieve at least a portion of the pressure from the engine core.

In some embodiments, the latch body includes a body section fixedly connected to the one of the first cowl member and the second cowl member. In some embodiments, the latch body further includes a neck section extending from the body section toward the other of the first cowl member and the second cowl member along a longitudinal axis. The neck section includes the at least one pressure relief component. In some embodiments, the latch body further includes a hook section extending from the neck section along the longitudinal axis.

The hook section removably engages with the latch keeper to detachably secure the first cowl member to the second cowl member. A maximum width of the neck section is less than a minimum width of each of the body section and the hook section. Each of the maximum width and the minimum width is along a transverse axis orthogonal to the longitudinal axis. The hook section may removably engage with the latch keeper, thereby securing the first cowl member to the second cowl member in the normal mode.

In some embodiments, the latch body includes a body section including at least one latch pin fixedly connected to the one of the first cowl member and the second cowl member and extending along a transverse axis. The at least one latch pin includes the at least one pressure relief component. In some embodiments, the latch body further includes a neck section extending from the body section toward the other of the first cowl member and the second cowl member along a longitudinal axis orthogonal to the transverse axis. In some embodiments, the latch body further includes a hook section extending from the neck section along the longitudinal axis. The hook section removably engages with the latch keeper to detachably secure the first cowl member to the second cowl member. A maximum width of the neck section is less than a minimum width of each of the body section and the hook section.

Each of the maximum width and the minimum width is along the transverse axis. The at least one latch pin may secure the first cowl member to the second cowl member in the normal mode.

In some embodiments, the latch body includes the at least one pressure relief component. In some embodiments, the latch body further includes a body section including at least one latch pin fixedly extending along a transverse axis. In some embodiments, the latch body further includes a mounting section spaced apart from the body section and fixedly connected to the one of the first cowl member and the second cowl member. In some embodiments, the latch body further includes a neck section extending from the body section toward the other of the first cowl member and the second cowl member along a longitudinal axis orthogonal to the transverse axis. In some embodiments, the latch body further includes a hook section extending from the neck section along the longitudinal axis. The hook section removably engages with the latch keeper to detachably secure the first cowl member to the second cowl member. A maximum width of the neck section is less than a minimum width of each of the body section and the hook section. Each of the maximum width and the minimum width is along the transverse axis. The at least one pressure relief component connects the at least one latch pin to the mounting section. The mounting section may secure the first cowl member to the second cowl member in the normal mode.

Thus, the at least one pressure relief component may be incorporated in different components of the latch body (e.g., the neck section or the at least one latch pin) as well as in different configurations of the latch body. This may provide the designer of the inner cowl arrangement multiple design options for desired application attributes.

In some embodiments, the latch keeper includes an attachment section fixedly connected to the other of the first cowl member and the second cowl member. The attachment section includes the at least one pressure relief component. In some embodiments, the latch keeper further includes a keeper section extending from the attachment section along a longitudinal axis. The keeper section removably engages with the latch body to detachably secure the first cowl member to the second cowl member. The attachment section may secure the first cowl member to the second cowl member in the normal mode.

Thus, the at least one pressure relief component may be incorporated in different components of the latch (e.g., the latch body or the latch keeper). This may provide the designer of the inner cowl arrangement multiple design options for desired application attributes.

In some embodiments, the first hinge includes a first hinge body fixedly connected to one of the first cowl member and the mounting structure. In some embodiments, the first hinge further includes a first hinge clevis fixedly connected to the other of the first cowl member and the mounting structure. In some embodiments, the first hinge further includes a first hinge pin pivotally connecting the first hinge clevis to the first hinge body. In some embodiments, the second hinge includes a second hinge body fixedly connected to one of the second cowl member and the mounting structure. In some embodiments, the second hinge further includes a second hinge clevis fixedly connected to the other of the second cowl member and the mounting structure. In some embodiments, the second hinge further includes a second hinge pin pivotally connecting the second hinge clevis to the second hinge body. At least one of the first hinge body, the second hinge body, the first hinge pin, and the second hinge pin includes the at least one pressure relief component. In the failure mode, the at least one pressure relief component at least partially deforms or breaks to cause at least one of the first cowl member and the second cowl member to detach from the mounting structure, thereby forming the at least one opening between the mounting structure and the at least one of the first cowl member and the second cowl member. Thus, in the failure mode, the first hinge and/or the second hinge may relieve at least a portion of the pressure from the engine core.

Thus, the at least one pressure relief component may be incorporated in different components of the first hinge and/or the second hinge. This may provide the designer of the inner cowl arrangement multiple design options for desired application attributes.

In some embodiments, the first hinge body includes a first body section fixedly attached to the one of the first cowl member and the mounting structure. The first body section includes the at least one pressure relief component. In some embodiments, the first hinge body further includes a first loop section extending from the first body section along a longitudinal axis. The first loop section defines a first through-hole at least partially receiving the first hinge pin therethrough along a transverse axis orthogonal to the longitudinal axis to pivotally connect the first hinge clevis to the first hinge body.

In some embodiments, the second hinge body includes a second body section fixedly attached to the one of the second cowl member and the mounting structure. The second body section includes the at least one pressure relief component.

In some embodiments, the second hinge body further includes a second loop section extending from the second body section along a longitudinal axis. The second loop section defines a second through-hole at least partially receiving the second hinge pin therethrough along a transverse axis orthogonal to the longitudinal axis to pivotally connect the second hinge clevis to the second hinge body.

In some embodiments, the inner cowl arrangement further includes a displacement limiter surrounding the at least one pressure relief component. In the failure mode, the displacement limiter is configured to: engage one or more flanges of the neck section to prevent detachment of the hook section from the one of the first cowl member and the second cowl member; engage one or more flanges of the attachment section to prevent detachment of the keeper section from the other of the first cowl member and the second cowl member; engage one or more flanges of the first body section to prevent detachment of the first loop section from the one of the first cowl member and the mounting structure; or engage one or more flanges of the second body section to prevent detachment of the second loop section from the one of the second cowl member and the mounting structure.

Thus, the displacement limiter may prevent complete detachment of the hook section from the one of the first cowl member and the second cowl member while forming the at least one opening to relieve at least the portion of the pressure from the engine core. The displacement limiter may: restrict the one or more flanges of the neck section within the displacement limiter; the one or more flanges of the attachment section within the displacement limiter; the one or more flanges of the first body section within the displacement limiter; or the one or more flanges of the second body section within the displacement limiter. Additionally, the displacement limiter may limit the movement of the first cowl member and/or the second cowl member to control a size of the at least one opening.

In some embodiments, the at least one pressure relief component includes a breakable portion defining a minimum width of the corresponding at least one of the neck section, the at least one latch pin, the attachment section, the first body section, the second body section, the first hinge pin, and the second hinge pin. In the failure mode, the breakable portion breaks to cause the at least one of the first cowl member and the second cowl member to move relative to the engine core. Thus, the breakable portion may allow formation of the at least one opening through the movement of the at least one of the first cowl member and the second cowl member relative to the engine core. The broken breakable portion may be visually detected during inspection or maintenance of the gas turbine engine.

In some embodiments, the at least one pressure relief component includes a spring. In the failure mode, the spring deforms to cause the at least one of the first cowl member and the second cowl member to move relative to the engine core. Thus, the spring may temporarily deform during the failure mode to cause the at least one of the first cowl member and the second cowl member to move relative to the engine core forming the at least one opening, while returning to an undeformed configuration following a shut-down of the gas turbine engine.

In some embodiments, in the failure mode, the applied load on the at least one pressure relief component is greater the normal operating load by a factor of at least 1.5.

According to a second aspect, there is provided a gas turbine engine including an engine core. The engine core includes a compressor, a combustor, a turbine, and a core shaft connecting the turbine to the compressor. Such a gas turbine engine may include a fan (having fan blades) located upstream of the engine core. The gas turbine engine further includes the inner cowl arrangement of the first aspect surrounding the engine core.

According to a third aspect, there is provided an aircraft including a fuselage, a wing extending from the fuselage, the gas turbine engine of the second aspect, a mounting structure for attaching the gas turbine engine to the wing. The inner cowl arrangement of the first aspect is attached to the mounting structure.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect.

Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 5A is a partial schematic top view of the inner cowl arrangement and the mounting structure in a failure mode, according to an embodiment of the present disclosure;

FIG. 5B is a partial schematic top view of the inner cowl arrangement and the mounting structure in the failure mode, according to another embodiment of the present disclosure;

FIG. 5C is a partial schematic bottom view of the inner cowl arrangement in the failure mode, according to another embodiment of the present disclosure;

FIGS. 6A and 6B are schematic bottom views of the inner cowl arrangement and a core exhaust nozzle in the normal mode and the failure mode, respectively, according to an embodiment of the present disclosure;

FIG. 15 is a schematic top view of the first hinge or the second hinge in the normal mode, according to an embodiment of the present disclosure;

DETAILED DESCRIPTION

Aspects and embodiments of the present disclosure will now be discussed with reference to the accompanying figures. Further aspects and embodiments will be apparent to those skilled in the art.

Figure 1:
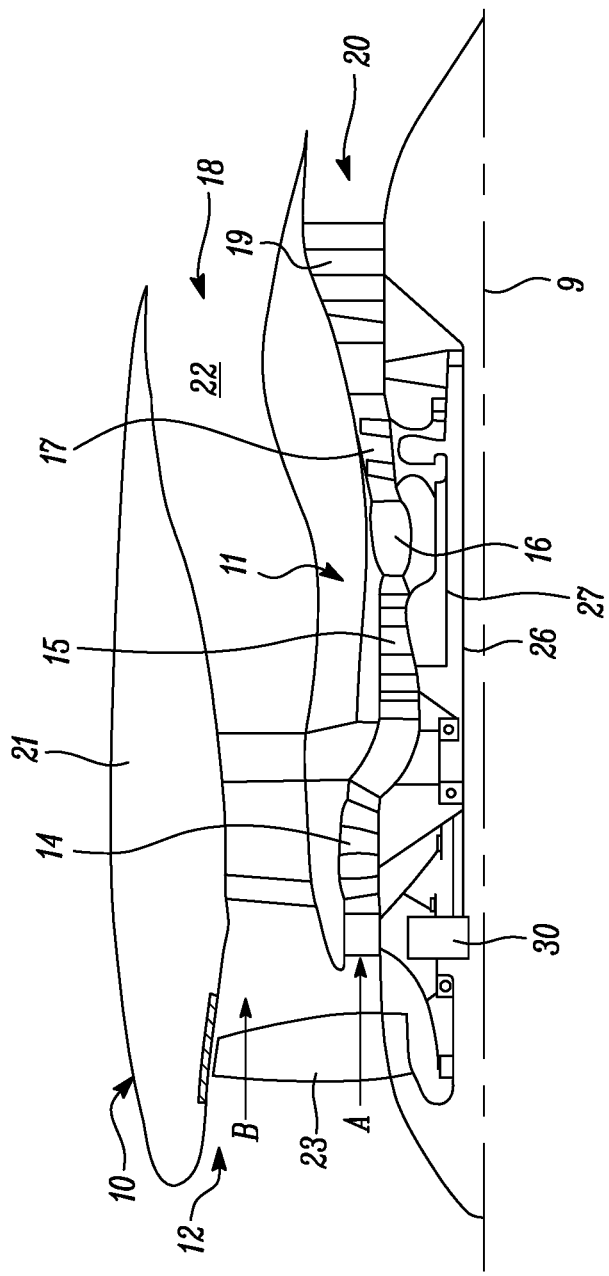
FIG. 1 is a sectional side view of a gas turbine engine, according to an embodiment of the present disclosure.

FIG. 1 illustrates a gas turbine engine 10 having a principal rotational axis 9, according to an embodiment of the present disclosure. The gas turbine engine 10 includes an air intake 12 and a propulsive fan 23 that generates two airflows: a core airflow A and a bypass airflow B. The gas turbine engine 10 further includes an engine core 11 that receives the core airflow A. The engine core 11 includes, in axial flow series, a low pressure compressor 14, a high pressure compressor 15, a combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting core shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23), respectively, and/or the turbine and compressor stages that are connected together by the interconnecting core shaft 27 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the engine core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle), or turboprop engine, for example. In some arrangements, the gas turbine engine 10 may not include the gearbox 30.

The geometry of the gas turbine engine 10, and components thereof, is defined by a conventional axis system, including an axial direction (which is aligned with the principal rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2:
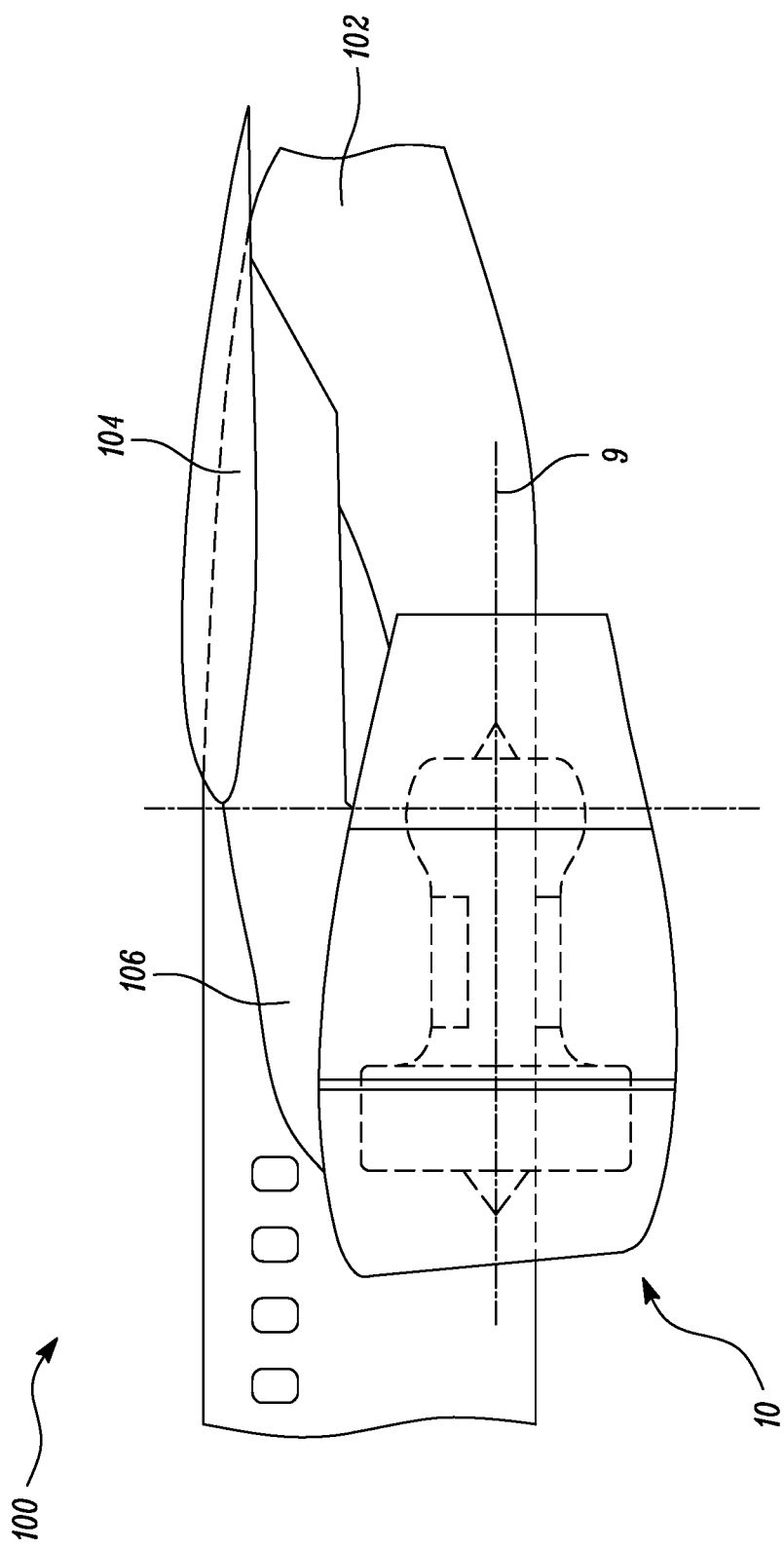
FIG. 2 is a partial schematic side view of an aircraft, according to an embodiment of the present disclosure.

FIG. 2 is a partial schematic side view of an aircraft 100, according to an embodiment of the present disclosure. In some embodiments, the aircraft 100 includes a fuselage 102 and a wing 104 extending from the fuselage 102. In some embodiments, the aircraft 100 further includes the gas turbine engine 10 and a mounting structure 106 for attaching the gas turbine engine 10 to the wing 104. In some embodiments, the mounting structure 106 is fixedly coupled to the wing 104 and the gas turbine engine 10. In some embodiments, the mounting structure 106 may allow thrust forces developed by the gas turbine engine 10 to be transmitted to the aircraft 100.

Figure 3B:
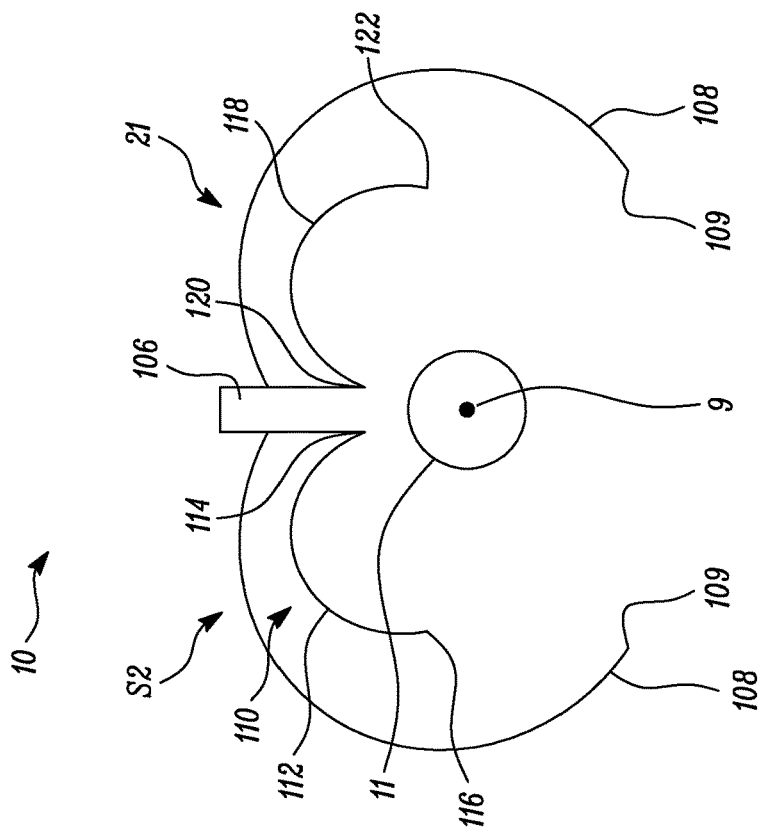
FIG. 3B is a schematic front sectional view of the gas turbine engine and the mounting structure in a service mode, according to an embodiment of the present disclosure.
Figure 3A:
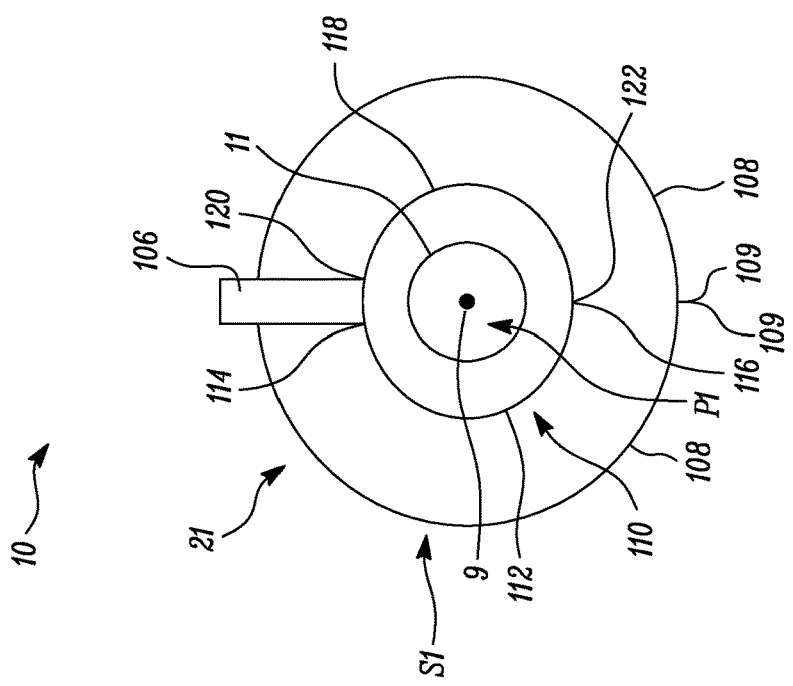
FIG. 3A is a schematic front sectional view of the gas turbine engine and a mounting structure in a normal mode, according to an embodiment of the present disclosure.

FIG. 3A is a schematic front sectional view of the gas turbine engine 10 and the mounting structure 106 in a normal mode S1, according to an embodiment of the present disclosure. FIG. 3B is a schematic front sectional view of the gas turbine engine 10 and the mounting structure 106 in a service mode S2, according to an embodiment of the present disclosure. Some components of the gas turbine engine 10 are not shown for the purpose of illustration.

Referring to FIGS. 3A and 3B, in some embodiments, the nacelle 21 of the gas turbine engine 10 is coupled to the mounting structure 106. In some embodiments, the nacelle 21 includes a plurality of cowls 108 hingedly coupled to the mounting structure 106. In some embodiments, the gas turbine engine 10 further includes an inner cowl arrangement 110. The inner cowl arrangement 110 is attached to the mounting structure 106. Specifically, the gas turbine engine 10 includes the inner cowl arrangement 110 surrounding the engine core 11.

The inner cowl arrangement 110 includes a first cowl member 112 and a second cowl member 118 opposing the first cowl member 112. The first cowl member 112 includes a first upper edge 114 and a first lower edge 116. The second cowl member 118 includes a second upper edge 120 and a second lower edge 122. Further, the plurality of cowls 108 include respective edges 109.

In some embodiments, the plurality of cowls 108, the first cowl member 112, and the second cowl member 118 are hingedly coupled to the mounting structure 106, such that the plurality of cowls 108, the first cowl member 112, and the second cowl member 118 are closed in the normal mode S1 (shown in FIG. 3A) and open in the service mode S2 (shown in FIG. 3B). In the service mode S2, internal components of the gas turbine engine 10 may be accessed, such as for service/maintenance. However, the gas turbine engine 10 remains in the normal mode S1 during normal operating conditions. In some embodiments, in the normal mode S1, the first cowl member 112 and the second cowl member 118 together retain a pressure P1 within the engine core 11, e.g., due to flow of air.

In some embodiments, the first lower edge 116 of the first cowl member 112 is disposed adjacent to the second lower edge 122 of the second cowl member 118 in the normal mode S1 (shown in FIG. 3A) while the first lower edge 116 and the second lower edge 122 are disposed away from each other in the service mode S2 (shown in FIG. 3B). The respective edges 109 of the plurality of cowls 108 are disposed adjacent to each other in the normal mode S1. Further, in the service mode S2, the respective edges 109 of the plurality of cowls 108 are disposed away from each other.

Figure 4B:
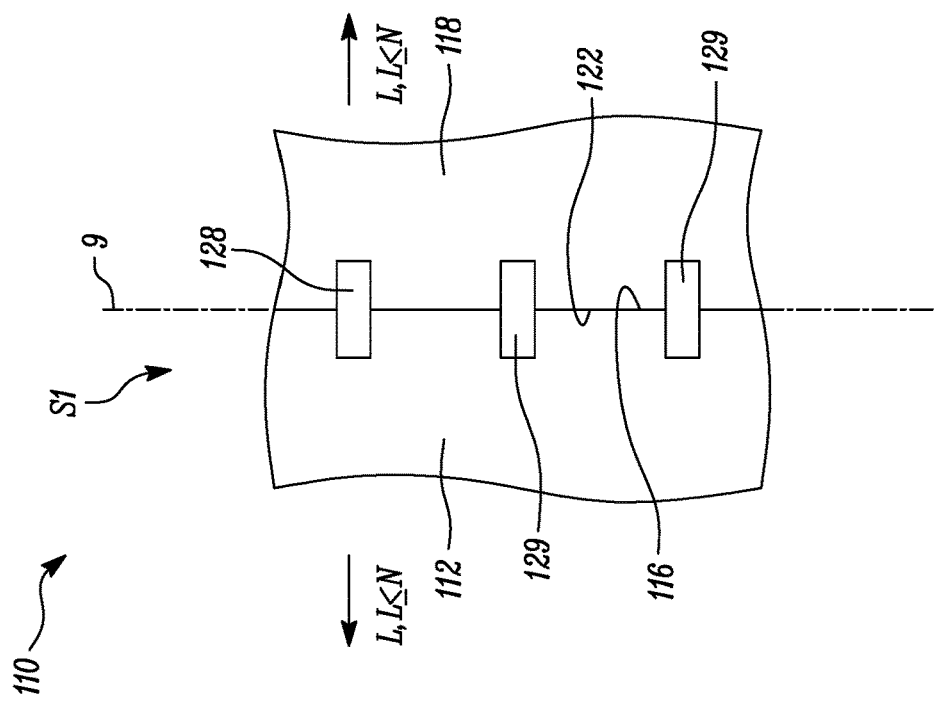
FIG. 4B is a partial schematic bottom view of the inner cowl arrangement in the normal mode, according to an embodiment of the present disclosure.
Figure 4A:
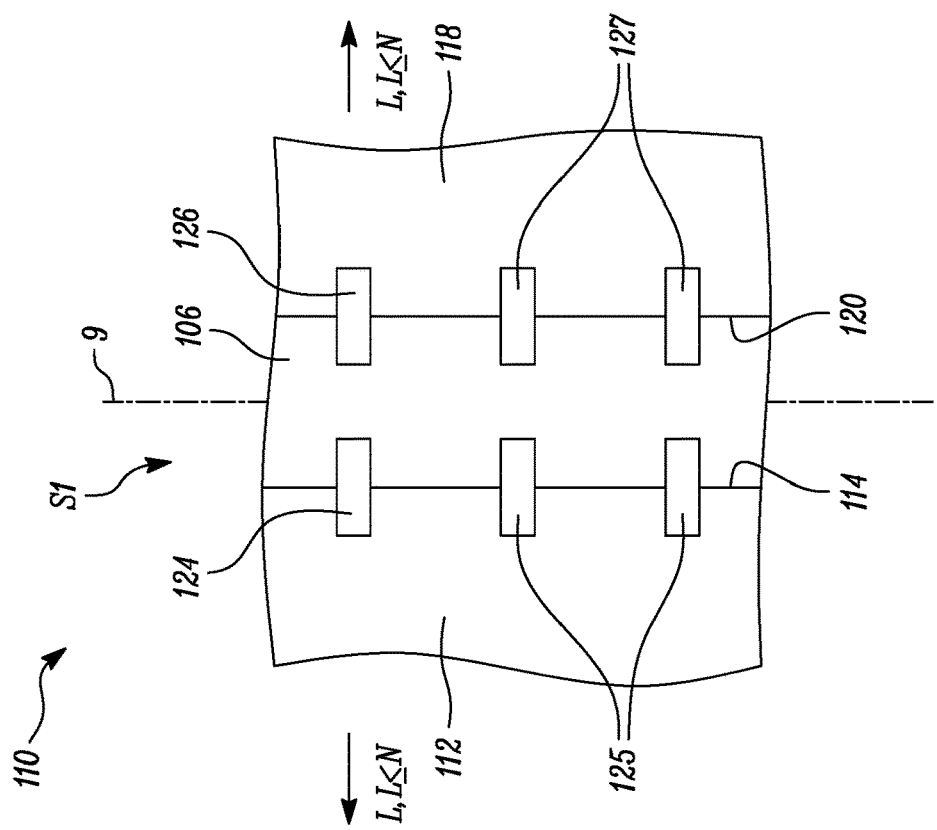
FIG. 4A is a partial schematic top view of the inner cowl arrangement and the mounting structure in the normal mode, according to an embodiment of the present disclosure.

FIG. 4A is a partial schematic top view of the inner cowl arrangement 110 and the mounting structure 106 in the normal mode S1, according to an embodiment of the present disclosure. The inner cowl arrangement 110 further includes a first hinge 124 pivotally connecting the first cowl member 112 to the mounting structure 106 proximal to the first upper edge 114. In some embodiments, the inner cowl arrangement 110 further includes one or more other hinges 125 for pivotally connecting the first cowl member 112 to the mounting structure 106. In some embodiments, the first hinge 124 and the one or more other hinges 125 are axially spaced apart from each other relative to the principal rotational axis 9. In some embodiments, the first hinge 124 may be a foremost hinge or a rearmost hinge relative to the principal rotational axis 9 that pivotally connects the first cowl member 112 to the mounting structure 106. However, in some other embodiments, the first hinge 124 may be located between the other hinges 125.

The inner cowl arrangement 110 further includes a second hinge 126 pivotally connecting the second cowl member 118 to the mounting structure 106 proximal to the second upper edge 120. In some embodiments, the inner cowl arrangement 110 further includes one or more other hinges 127 for pivotally connecting the second cowl member 118 to the mounting structure 106. In some embodiments, the second hinge 126 and the one or more other hinges 127 are axially spaced apart from each other relative to the principal rotational axis 9. In some embodiments, the second hinge 126 may be a foremost hinge or a rearmost hinge relative to the principal rotational axis 9 that pivotally connects the second cowl member 118 to the mounting structure 106. However, in some other embodiments, the second hinge 126 may be located between the other hinges 127. In some embodiments, the first hinge 124 may be disposed circumferentially adjacent to the second hinge 126.

FIG. 4B is a partial schematic bottom view of the inner cowl arrangement 110 in the normal mode S1, according to an embodiment of the present disclosure. The inner cowl arrangement 110 further includes a latch 128 detachably securing the first lower edge 116 of the first cowl member 112 to the second lower edge 122 of the second cowl member 118. In some embodiments, the inner cowl arrangement 110 further includes one or more other latches 129 detachably securing the first cowl member 112 to the second cowl member 118. In some embodiments, the latch 128 and the one or more other latches 129 are axially spaced apart from each other relative to the principal rotational axis 9. In some embodiments, the latch 128 may be a foremost latch or a rearmost latch relative to the principal rotational axis 9 that detachably secures the first lower edge 116 to the second lower edge 122. However, in some other embodiments, the latch 128 may be located between the other latches 129.

In some embodiments, the latch 128 may secure the first cowl member 112 to the second cowl member 118 in the normal mode S1 and during normal operating conditions of the gas turbine engine 10 (shown in FIGS. 1-3B), thereby retaining the pressure P1 (shown in FIG. 3A) within the engine core 11 (shown in FIGS. 3A and 3B). In some embodiments, the pressure P1 within the engine core 11 may generate a circumferential force on each of the first hinge 124, the one or more other hinges 125, the second hinge 126, the one or more other hinges 127, the latch 128, and the one or more other latches 129.

Referring now to FIGS. 4A and 4B, at least one of the first hinge 124, the second hinge 126, and the latch 128 includes at least one pressure relief component 130 (shown in FIGS. 7A-17B) configured to receive an applied load L due to the pressure P1 (shown in FIG. 3A) within the engine core 11 (shown in FIGS. 3A and 3B). In the normal mode S1, the applied load L on the at least one pressure relief component 130 is less than or equal to a normal operating load N. As used herein, the term "normal operating load N" refers to the applied load L received by the first hinge 124, the second hinge 126, and/or the latch 128 due to the pressure P1 within the engine core 11 during normal operating conditions of the gas turbine engine 10. Specifically, the term "normal operating load N" refers to the applied load received by the first hinge 124, the second hinge 126, and/or the latch 128 due to the pressure P1 within the engine core 11 prior to any burst duct event. The term "at least one pressure relief component" may be interchangeably used hereinafter as the "pressure relief component".

In some embodiments, only the first hinge 124 includes the pressure relief component 130 and the one or more other hinges 125 do not include the pressure relief component 130. Similarly, in some embodiments, only the second hinge 126 includes the pressure relief component 130 and the one or more other hinges 127 do not include the pressure relief component 130. Further, in some embodiments, only the latch 128 includes the pressure relief component 130 and the one or more other latches 129 do not include the pressure relief component 130. However, in alternative embodiments, some of the one or more other hinges 125 adjacent to the first hinge 124, some of the one or more other hinges 127 adjacent the second hinge 126, or some of the one or more other latches 129 adjacent to the latch 128 may also include the pressure relief component 130.

In some embodiments, during a burst duct event, a large amount of high pressure and high temperature air may be released within the engine core 11 (shown in FIG. 3A), thereby causing an increase in the pressure P1 retained by the first cowl member 112 and the second cowl member 118 relative to a surrounding ambient pressure. This condition may be hereinafter referred to as a failure mode S3 (shown in FIGS. 5A-5C).

FIG. 5A is a partial schematic top view of the inner cowl arrangement 110 and the mounting structure 106 in the failure mode S3, according to an embodiment of the present disclosure. FIG. 5B is a partial schematic top view of the inner cowl arrangement 110 and the mounting structure 106 in the failure mode S3, according to another embodiment of the present disclosure. FIG. 5C is a partial schematic bottom view of the inner cowl arrangement 110 in the failure mode S3, according to another embodiment of the present disclosure.

Referring now to FIGS. 5A-5C, in the failure mode S3, when the applied load L on the at least one pressure relief component 130 is greater the normal operating load N, the at least one pressure relief component 130 at least partially deforms or breaks to cause at least one of the first cowl member 112 and the second cowl member 118 to move relative to the engine core 11 (shown in FIGS. 3A and 3B). In some embodiments, during the burst duct event, the pressure P1 increases inside the engine core 11, thereby causing higher load on the latch 128, the one or more other latches 129, the first hinge 124, the one or more other hinges 125, the second hinge 126, and the one or more other hinges 127. This may cause the pressure relief component 130 to at least partially deform or break following the burst duct event.

In some embodiments, in the failure mode S3, the applied load L on the at least one pressure relief component 130 is greater the normal operating load N by a factor of at least 1.5. In some embodiments, in the failure mode S3, the applied load L on the at least one pressure relief component 130 is greater the normal operating load N by a factor of at least 1.6, at least 1.8, at least 2, at least 2.5, or at least 3.

Figure 13A:
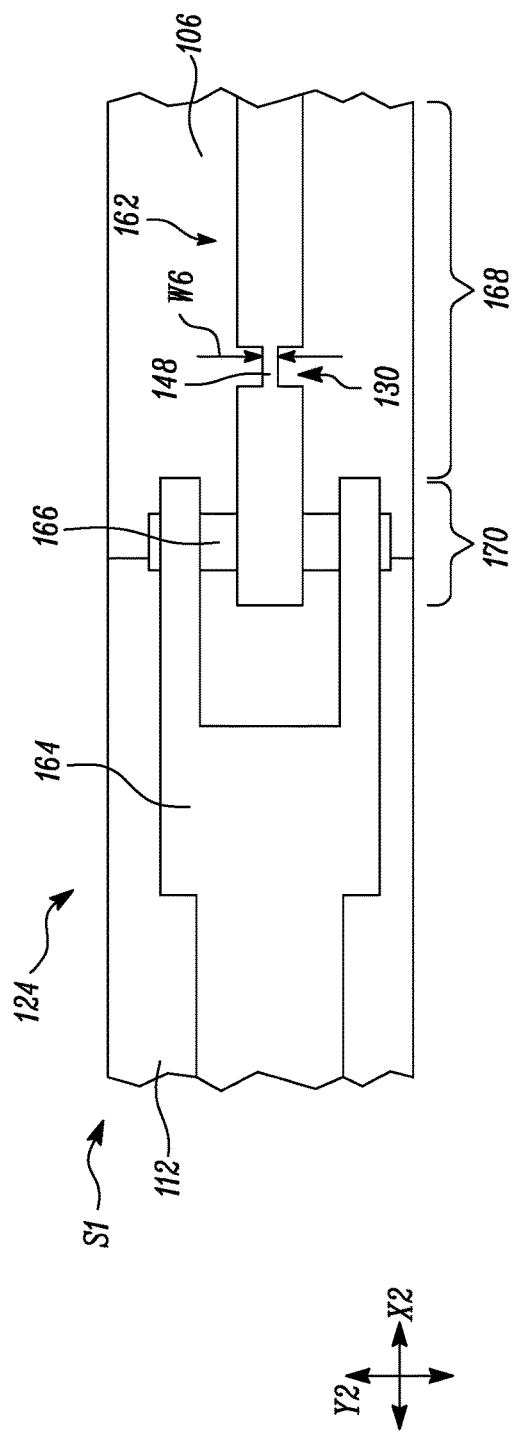
FIG. 13A is a schematic top view of a first hinge in the normal mode, according to an embodiment of the present disclosure.

In the illustrated embodiment of FIG. 5A, the first hinge 124 includes the at least one pressure relief component 130 (shown in FIG. 13A). Therefore, in the failure mode S3, when the at least one pressure relief component 130 at least partially deforms or breaks, the first cowl member 112 moves relative to the engine core 11 (shown in FIGS. 3A and 3B) away from the mounting structure 106. In the illustrated embodiment of FIG. 5B, the second hinge 126 includes the at least one pressure relief component 130 (shown in FIG. 14A). Therefore, in the failure mode S3, when the at least one pressure relief component 130 at least partially deforms or breaks, the second cowl member 118 moves relative to the engine core 11 away from the mounting structure 106. In the illustrated embodiment of FIG. 5C, the latch 128 includes the at least one pressure relief component 130 (shown in FIG. 7A). Therefore, in the failure mode S3, the first cowl member 112 and/or the second cowl member 118 move relative to the engine core 11.

Referring to FIGS. 5A-5C, a movement of the at least one of the first cowl member 112 and the second cowl member 118 relative to the engine core 11 (shown in FIGS. 3A and 3B) forms at least one opening 132 to relieve at least a portion of the pressure P1 from the engine core 11. Specifically, the movement of the at least one of the first cowl member 112 and the second cowl member 118 relative to the engine core 11 forms the at least one opening 132 in the inner cowl arrangement 110 to relieve at least the portion of the pressure P1 from the engine core 11. In other words, the movement of the at least one of the first cowl member 112 and the second cowl member 118 may relieve the over-pressure inside the engine core 11 though the at least one opening 132 following the burst duct event. The term "at least one opening 132" may be interchangeably used hereinafter as "the opening 132". Thus, the inner cowl arrangement 110 of the present disclosure may relieve the over-pressure from within the engine core 11 during the burst duct event.

As shown in FIG. 5A, the opening 132 is formed between the first cowl member 112 and the mounting structure 106. As shown in FIG. 5B, the opening 132 is formed between the second cowl member 118 and the mounting structure 106. As shown in FIG. 5C, the opening 132 is formed between the first cowl member 112 and the second cowl member 118.

In some embodiments, the at least one pressure relief component 130 (shown in FIGS. 7A-17B) may at least partially deform or break in response to a threshold pressure differential and may discharge the over-pressure outside the engine core 11 (shown in FIGS. 3A and 3B) following the burst duct event. This may reduce a pressure peak occurring just after the burst duct event. This may further allow pressure stabilization inside the nacelle 21 (shown in FIGS. 3A and 3B) after the burst duct event. Additionally, the deformation or breakage of the at least one pressure relief component 130 may be visually detected during inspection or maintenance of the gas turbine engine 10 (shown in FIGS. 1-3B), thereby indicating occurrence of the burst duct event after operation of the gas turbine engine 10.

FIGS. 6A and 6B are exemplary schematic bottom views of the inner cowl arrangement 110 and the core exhaust nozzle 20 in the normal mode S1 and the failure mode S3, respectively. In the illustrated embodiment of FIGS. 6A and 6B, the latch 128 including the at least one pressure relief component 130 (shown in FIG. 7A) is disposed proximal to the core exhaust nozzle 20. In other words, the latch 128 may be an aftmost latch relative to the principal rotational axis 9 that secures the first cowl member 112 to the second cowl member 118. Thus, during the burst duct event or the failure mode S3, the at least one pressure relief component 130 of the latch 128 at least partially deforms or breaks and may remove a constraint between the first cowl member 112 and the second cowl member 118, thereby causing the first cowl member 112 and the second cowl member 118 to move relative to the engine core 11 (shown in FIGS. 3A and 3B) and discharging the over-pressure inside the engine core 11.

In some embodiments, the one or more other latches 129 may remain intact during the burst duct event, thereby maintaining a structural integrity of the inner cowl arrangement 110.

In some embodiments, the at least one opening 132 may allow discharge of air from the engine core 11 (shown in FIGS. 3A and 3B) between the first cowl member 112 and the second cowl member 118 along the principal rotational axis 9. In some embodiments, the at least one opening 132 may also allow discharge of air between the first cowl member 112 or the second cowl member 118 and the core exhaust nozzle 20 along a circumferential direction C.

Figure 14A:
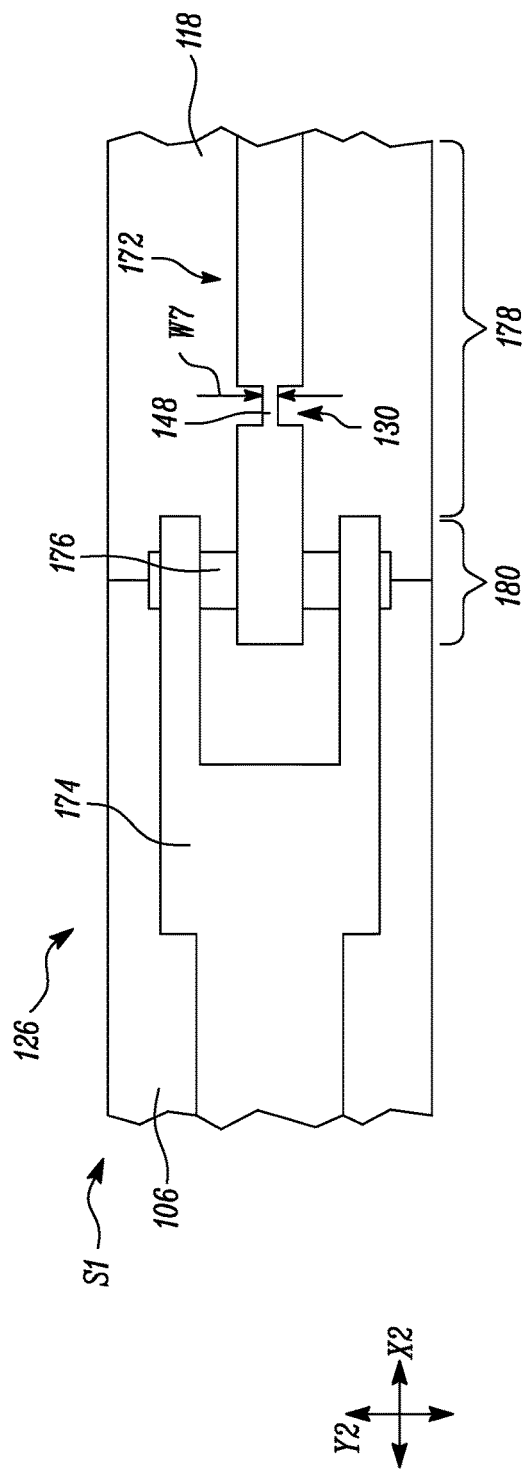
FIG. 14A is a schematic top view of a second hinge in the normal mode, according to an embodiment of the present disclosure.

It should be understood that the features described in FIGS. 6A and 6B with reference to the latch 128 are also applicable to the first hinge 124 (shown in FIG. 13A) including the at least one pressure relief component 130 (shown in FIG. 13A) and/or the second hinge 126 (shown in FIG. 14A) including the at least one pressure relief component 130 (shown in FIG. 14A). Further, the one or more other hinges 125, 127 (shown in FIGS. 4A, 5A, and 5B) may remain intact during the burst duct event, thereby maintaining the structural integrity of the inner cowl arrangement 110.

Figure 7A:
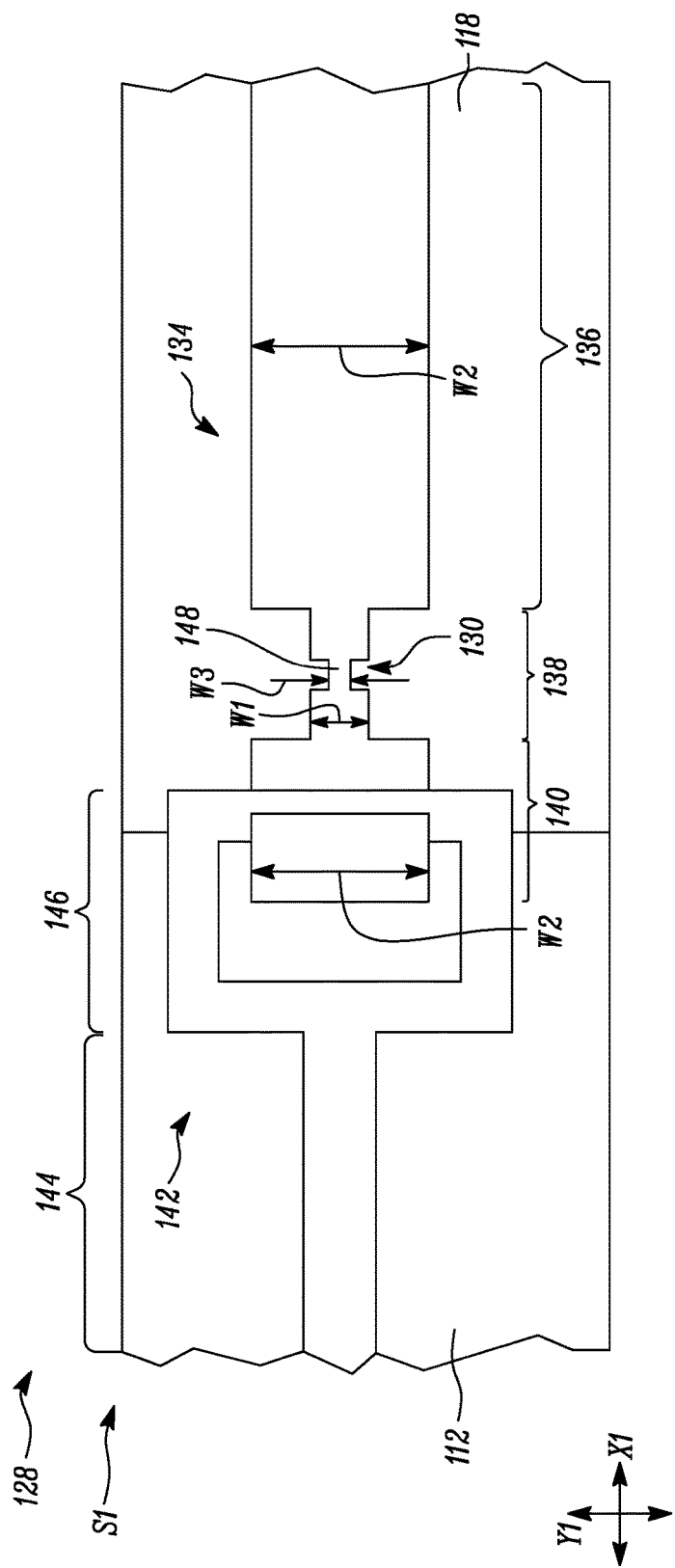
FIG. 7A is a schematic bottom view of a latch in the normal mode, according to an embodiment of the present disclosure.

FIG. 7A is a schematic bottom view of the latch 128 in the normal mode S1, according to an embodiment of the present disclosure.

In some embodiments, the latch 128 includes a latch body 134 fixedly connected to one of the first cowl member 112 and the second cowl member 118. In some embodiments, the latch 128 further includes a latch keeper 142 fixedly connected to the other of the first cowl member 112 and the second cowl member 118. In the illustrated embodiment of FIG. 7A, the latch body 134 is fixedly connected to the second cowl member 118 and the latch keeper 142 is fixedly connected to the first cowl member 112. However, in some other embodiments, the latch body 134 may be fixedly connected to the first cowl member 112 and the latch keeper 142 may be fixedly connected to the second cowl member 118.

In some embodiments, the latch body 134 includes a body section 136 fixedly connected to the one of the first cowl member 112 and the second cowl member 118. In some embodiments, the latch body 134 further includes a neck section 138 extending from the body section 136 toward the other of the first cowl member 112 and the second cowl member 118 along a longitudinal axis X1. In the illustrated embodiment of FIG. 7A, the body section 136 is fixedly connected to the second cowl member 118, and the neck section 138 extends from the body section 136 toward the first cowl member 112 along the longitudinal axis X1.

In some embodiments, the latch body 134 further includes a hook section 140 extending from the neck section 138 along the longitudinal axis X1. Specifically, the latch body 134 further includes the hook section 140 extending from the neck section 138 toward the other of the first cowl member 112 and the second cowl member 118 along the longitudinal axis X1. In the illustrated embodiment of FIG. 7A, the hook section 140 extends from the neck section 138 toward the first cowl member 112 along the longitudinal axis X1. In some embodiments, a maximum width W1 of the neck section 138 is less than a minimum width W2 of each of the body section 136 and the hook section 140. In some embodiments, each of the maximum width W1 and the minimum width W2 is along a transverse axis Y1 orthogonal to the longitudinal axis X1.

In some embodiments, the latch keeper 142 includes an attachment section 144 fixedly connected to the other of the first cowl member 112 and the second cowl member 118. In the illustrated embodiment of FIG. 7A, the attachment section 144 is fixedly connected to the first cowl member 112. In some embodiments, the latch keeper 142 further includes a keeper section 146 extending from the attachment section 144 along the longitudinal axis X1.

Figure 7B:
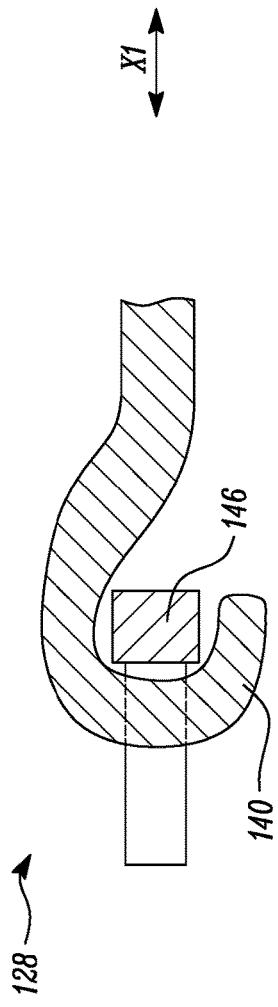
FIG. 7B is a partial schematic sectional side view of a hook section and a keeper section of the latch, according to an embodiment of the present disclosure.

FIG. 7B is a partial schematic sectional side view of the hook section 140 and the keeper section 146. Referring now to FIGS. 7A and 7B, in some embodiments, the latch keeper 142 removably engages with the latch body 134 to detachably secure the first cowl member 112 to the second cowl member 118. Specifically, in the illustrated embodiment of FIGS. 7A and 7B, the hook section 140 removably engages with the latch keeper 142 to detachably secure the first cowl member 112 to the second cowl member 118. Additionally, the keeper section 146 removably engages with the latch body 134 to detachably secure the first cowl member 112 to the second cowl member 118. More specifically, the hook section 140 removably engages with the keeper section 146 to detachably secure the first cowl member 112 to the second cowl member 118.

In some embodiments, at least one of the latch body 134 and latch keeper 142 includes the at least one pressure relief component 130. In the illustrated embodiment of FIG. 7A, the latch body 134 includes the pressure relief component 130. Specifically, the neck section 138 includes the pressure relief component 130.

Referring now to FIGS. 5C and 7A, in some embodiments, in the failure mode S3, the at least one pressure relief component 130 at least partially deforms or breaks to cause the first cowl member 112 to detach from the second cowl member 118, thereby forming the at least one opening 132 between the first cowl member 112 and the second cowl member 118.

In the illustrated embodiment of FIG. 7A, the at least one pressure relief component 130 includes a breakable portion 148 defining a minimum width W3 of the neck section 138. In some embodiments, the breakable portion 148 is configured to break upon application of a threshold load (e.g., the applied load L greater than the normal operating load N). Specifically, in the failure mode S3, the breakable portion 148 breaks to cause the at least one of the first cowl member 112 and the second cowl member 118 to move relative to the engine core 11 (shown in FIGS. 3A and 3B). In some embodiments, the breakable portion 148 breaks upon application of the threshold load, thereby forming the opening 132 (shown in FIG. 5C) between the first cowl member 112 and the second cowl member 118. Specifically, in some embodiments, the breakable portion 148 breaks upon application of the threshold load and causes the at least one of the first cowl member 112 and the second cowl member 118 to move relative to the engine core 11, thereby forming the opening 132 between the first cowl member 112 and the second cowl member 118.

Therefore, when the breakable portion 148 of the neck section 138 of the latch body 134 breaks upon application of the threshold load, the hook section 140 detaches from the one of the first cowl member 112 and the second cowl member 118. This causes the one of the first cowl member 112 and the second cowl member 118 to move relative to the engine core 11, thereby forming the opening 132 between the first cowl member 112 and the second cowl member 118.

Thus, the latch 128 may detachably secure the first cowl member 112 to the second cowl member 118 during the normal mode S1, thereby maintaining the structural integrity of the inner cowl arrangement 110 (shown in FIGS. 3A-4B) while allowing the at least one pressure relief component 130 to break during the failure mode S3, thereby forming the at least one opening 132.

Figure 8:
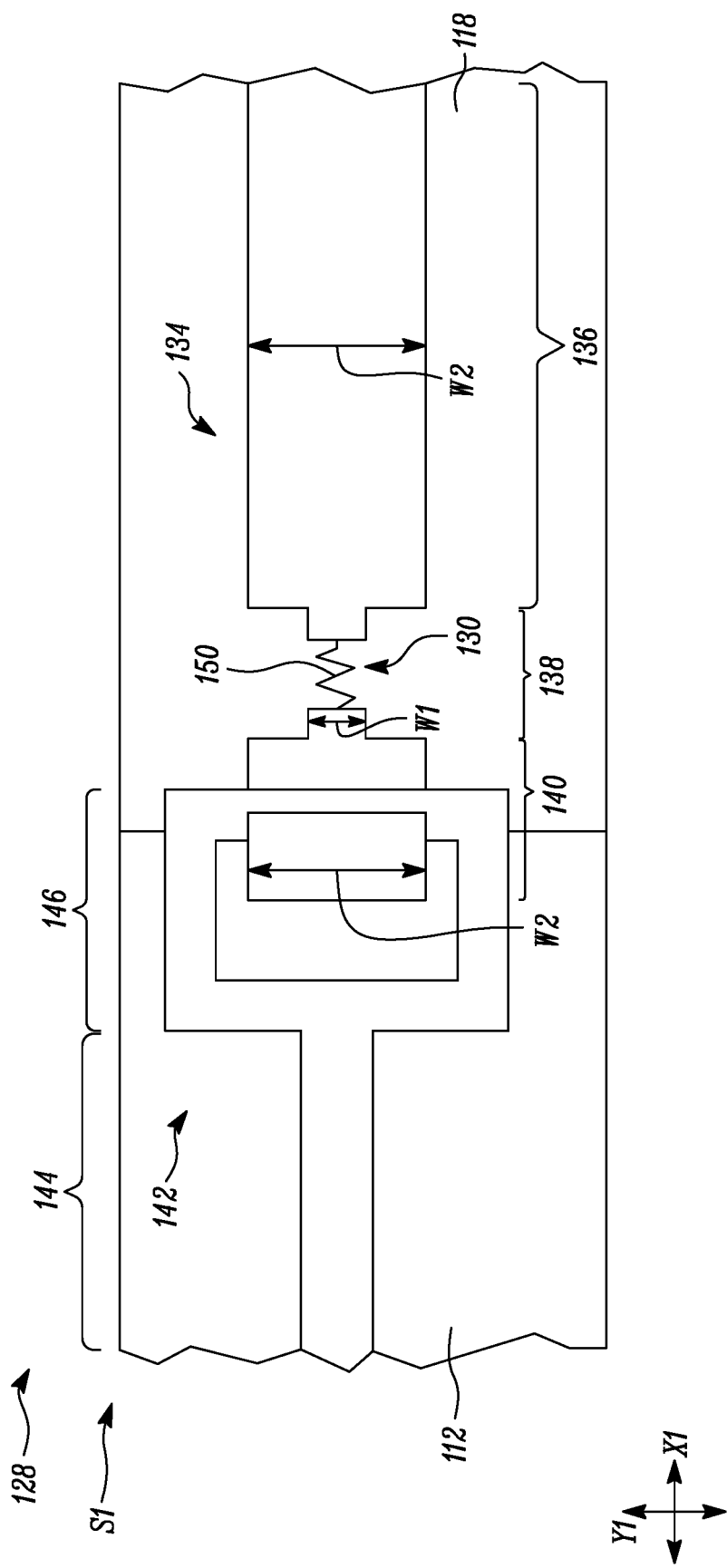
FIG. 8 is a schematic bottom view of the latch in the normal mode, according to another embodiment of the present disclosure.

FIG. 8 is a schematic bottom view of the latch 128 in the normal mode S1, according to another embodiment of the present disclosure. In the illustrated embodiment of FIG. 8, the at least one pressure relief component 130 includes a spring 150. Referring now to FIGS. 5C and 8, in some embodiments, in the failure mode S3, the spring 150 deforms to cause the at least one of the first cowl member 112 and the second cowl member 118 to move relative to the engine core 11 (shown in FIGS. 3A and 3B).

In some embodiments, the spring 150 expands upon application of the threshold load, thereby forming the opening 132 (shown in FIG. 5C) between the first cowl member 112 and the second cowl member 118. Thus, the spring 150 may temporarily deform during the failure mode S3 to cause the at least one of the first cowl member 112 and the second cowl member 118 to move relative to the engine core 11, while returning to an undeformed configuration following a shut-down of the gas turbine engine 10 (shown in FIG. 1).

Therefore, when the spring 150 of the neck section 138 of the latch body 134 expands or deforms upon application of the threshold load, the one of the first cowl member 112 and the second cowl member 118 moves relative to the engine core 11, thereby forming the opening 132 between the first cowl member 112 and the second cowl member 118.

Figure 9:
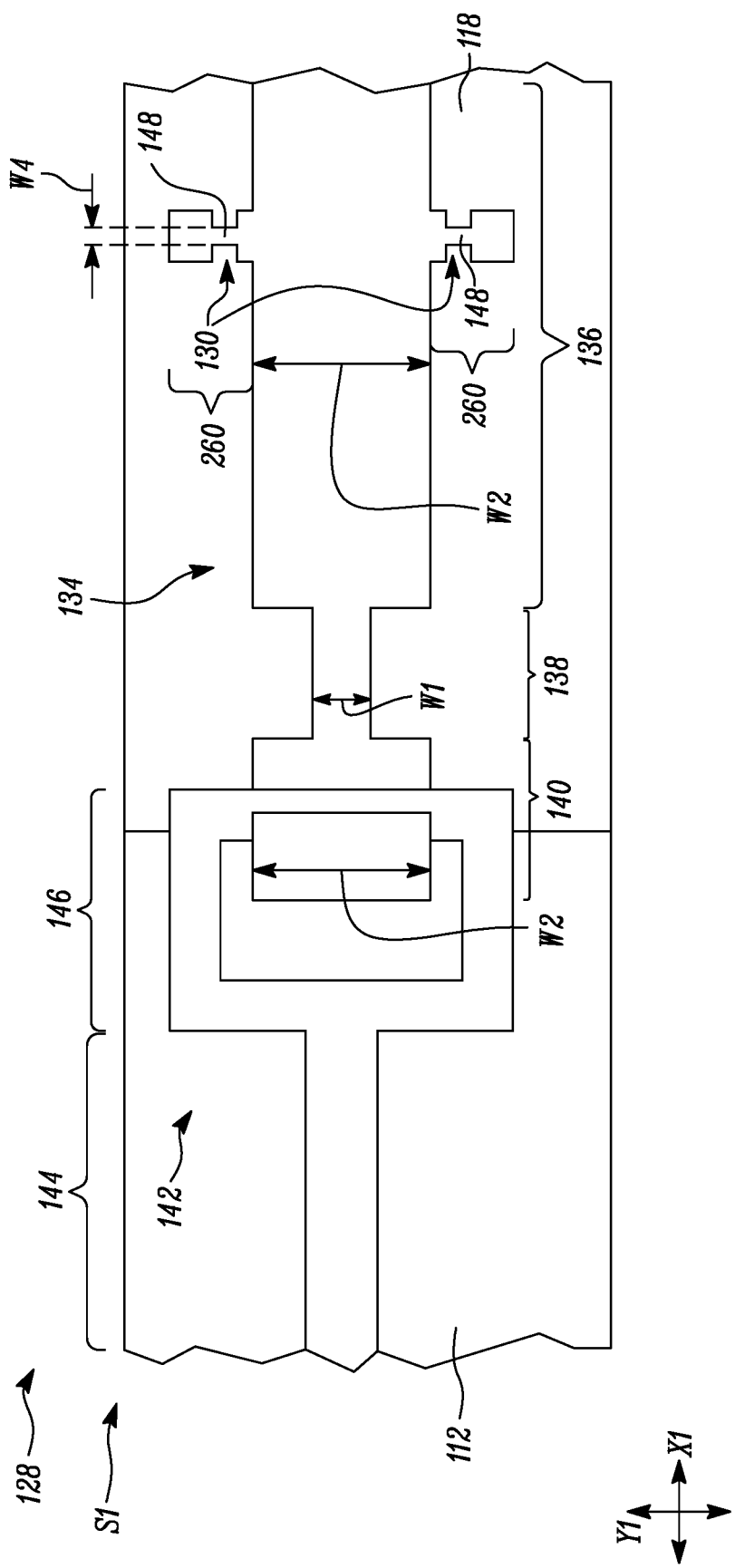
FIG. 9 is a schematic bottom view of the latch in the normal mode, according to another embodiment of the present disclosure.

FIG. 9 is a schematic bottom view of the latch 128 in the normal mode S1, according to another embodiment of the present disclosure. In the illustrated embodiment of FIG. 9, the latch body 134 is fixedly connected to one of the first cowl member 112 and the second cowl member 118. However, the body section 136 includes at least one latch pin 260 fixedly connected to the one of the first cowl member 112 and the second cowl member 118 and extending along the transverse axis Y1. In the illustrated embodiment of FIG. 9, the latch body 134 is fixedly connected to the second cowl member 118. Specifically, the at least one latch pin 260 is fixedly connected to the second cowl member 118. Further, the latch keeper 142 is fixedly connected to the first cowl member 112. Specifically, the attachment section 144 is fixedly connected to the first cowl member 112.

In the illustrated embodiment of FIG. 9, the at least one latch pin 260 includes a pair of latch pins 260, however, it should be understood that the body section 136 may include any number of the latch pins 260.

As discussed above, in some embodiments, at least one of the latch body 134 and the latch keeper 142 includes the at least one pressure relief component 130. In the illustrated embodiment of FIG. 9, the latch body 134 includes the pressure relief component 130. Specifically, the at least one latch pin 260 includes the at least one pressure relief component 130. Further, the at least one pressure relief component 130 includes the breakable portion 148 defining a minimum width W4 of the at least one latch pin 260.

The at least one latch pin 260 fixedly connected to the one of the first cowl member 112 and the second cowl member 118 connects the latch body 134 to the one of the first cowl member 112 and the second cowl member 118. Therefore, when the breakable portion 148 of the at least one latch pin 260 breaks upon application of the threshold load, the latch body 134 detaches from the one of the first cowl member 112 and the second cowl member 118. This causes the one of the first cowl member 112 and the second cowl member 118 to move relative to the engine core 11, thereby forming the opening 132 between the first cowl member 112 and the second cowl member 118.

Figure 10:
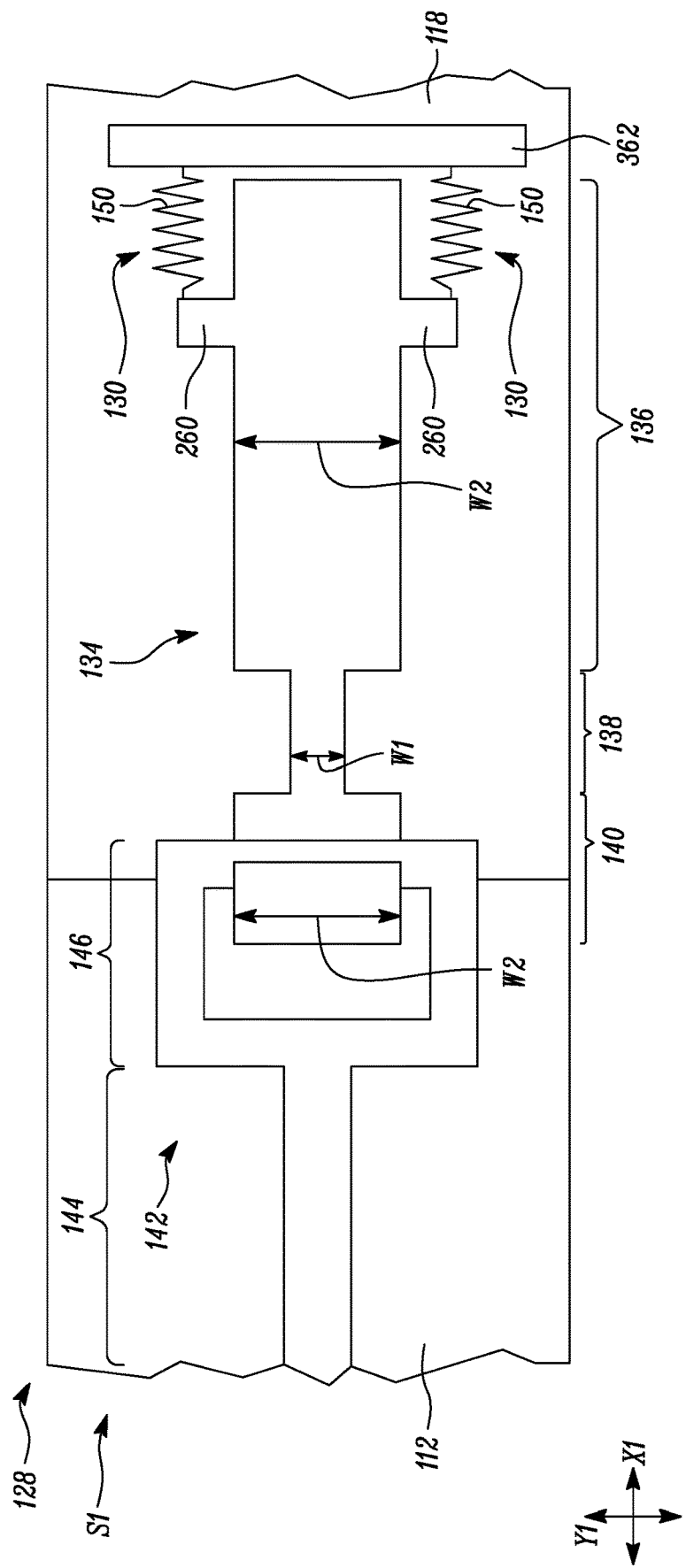
FIG. 10 is a schematic bottom view of the latch in the normal mode, according to another embodiment of the present disclosure.

FIG. 10 is a schematic bottom view of the latch 128 in the normal mode S1, according to another embodiment of the present disclosure. In the illustrated embodiment of FIG. 10, the latch body 134 is fixedly connected to one of the first cowl member 112 and the second cowl member 118. Specifically, in the illustrated embodiment of FIG. 10, the latch body 134 is fixedly connected to the second cowl member 118. Further, the body section 136 includes the at least one latch pin 260 fixedly extending along the transverse axis Y1. However, the latch body 134 further includes a mounting section 362 spaced apart from the body section 136 and fixedly connected to the one of the first cowl member 112 and the second cowl member 118. Specifically, the mounting section 362 is fixedly connected to the second cowl member 118. In the illustrated embodiment of FIG. 10, the latch keeper 142 is fixedly connected to the first cowl member 112. Further, the at least one latch pin 260 includes a pair of latch pins 260, however, it should be understood that the body section 136 may include any number of the latch pins 260.

As discussed above, in some embodiments, at least one of the latch body 134 and the latch keeper 142 includes the at least one pressure relief component 130. In the illustrated embodiment of FIG. 10, the latch body 134 includes the pressure relief component 130. In some embodiments, the at least one pressure relief component 130 connects the at least one latch pin 260 to the mounting section 362. Further, the at least one pressure relief component 130 includes the spring 150. Specifically, in the illustrated embodiment of FIG. 10, a pair of springs 150 are provided for the pair of latch pins 260. Further, each of the pair of springs 150 connects a corresponding latch pin 260 from the pair of latch pins 260 to the mounting section 362. Referring now to FIGS. 5C and 10, in some embodiments, in the failure mode S3, the springs 150 deform to cause the at least one of the first cowl member 112 and the second cowl member 118 to move relative to the engine core 11 (shown in FIGS. 3A and 3B).

Figure 11:
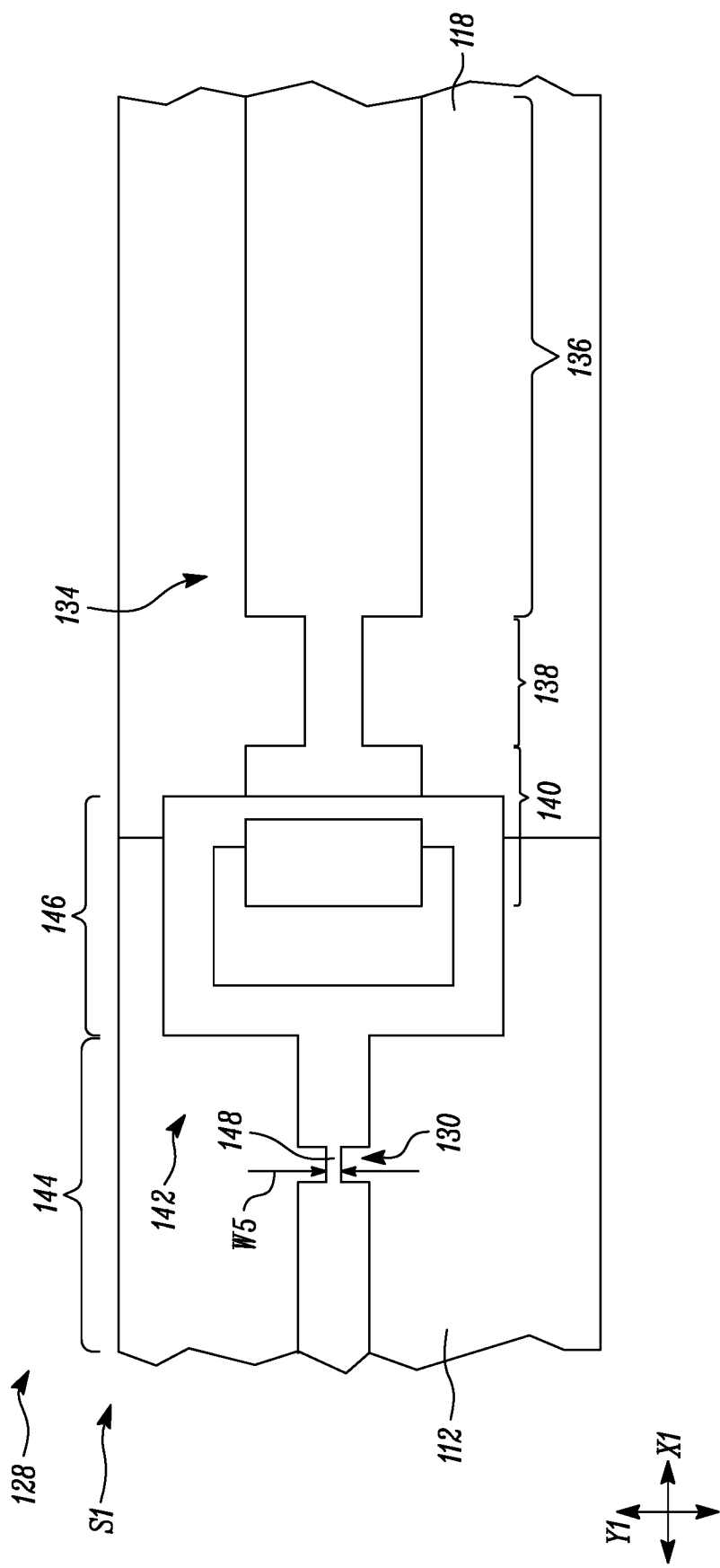
FIG. 11 is a schematic bottom view of the latch in the normal mode, according to another embodiment of the present disclosure.

Therefore, when the spring 150 expands or deforms upon application of the threshold load, the one of the first cowl member 112 and the second cowl member 118 moves relative to the engine core 11, thereby forming the opening 132 between the first cowl member 112 and the second cowl member 118. FIG. 11 is a schematic bottom view of the latch 128 in the normal mode S1, according to another embodiment of the present disclosure. As discussed above, at least one of the latch body 134 and the latch keeper 142 includes the at least one pressure relief component 130. In the illustrated embodiment of FIG. 11, the latch keeper 142 includes the at least one pressure relief component 130. Specifically, the attachment section 144 of the latch keeper 142 includes the at least one pressure relief component 130. Further, the at least one pressure relief component 130 includes the breakable portion 148 defining a minimum width W5 of the attachment section 144. Referring now to FIGS. 5C and 11, in the failure mode S3, the breakable portion 148 breaks to cause the at least one of the first cowl member 112 and the second cowl member 118 to move relative to the engine core 11 (shown in FIGS. 3A and 3B).

Therefore, when the breakable portion 148 breaks upon application of the threshold load, the keeper section 146 of the latch keeper 142 detaches from the other of the first cowl member 112 and the second cowl member 118. This causes the other of the first cowl member 112 and the second cowl member 118 to move relative to the engine core 11, thereby forming the opening 132 between the first cowl member 112 and the second cowl member 118.

Figure 12:
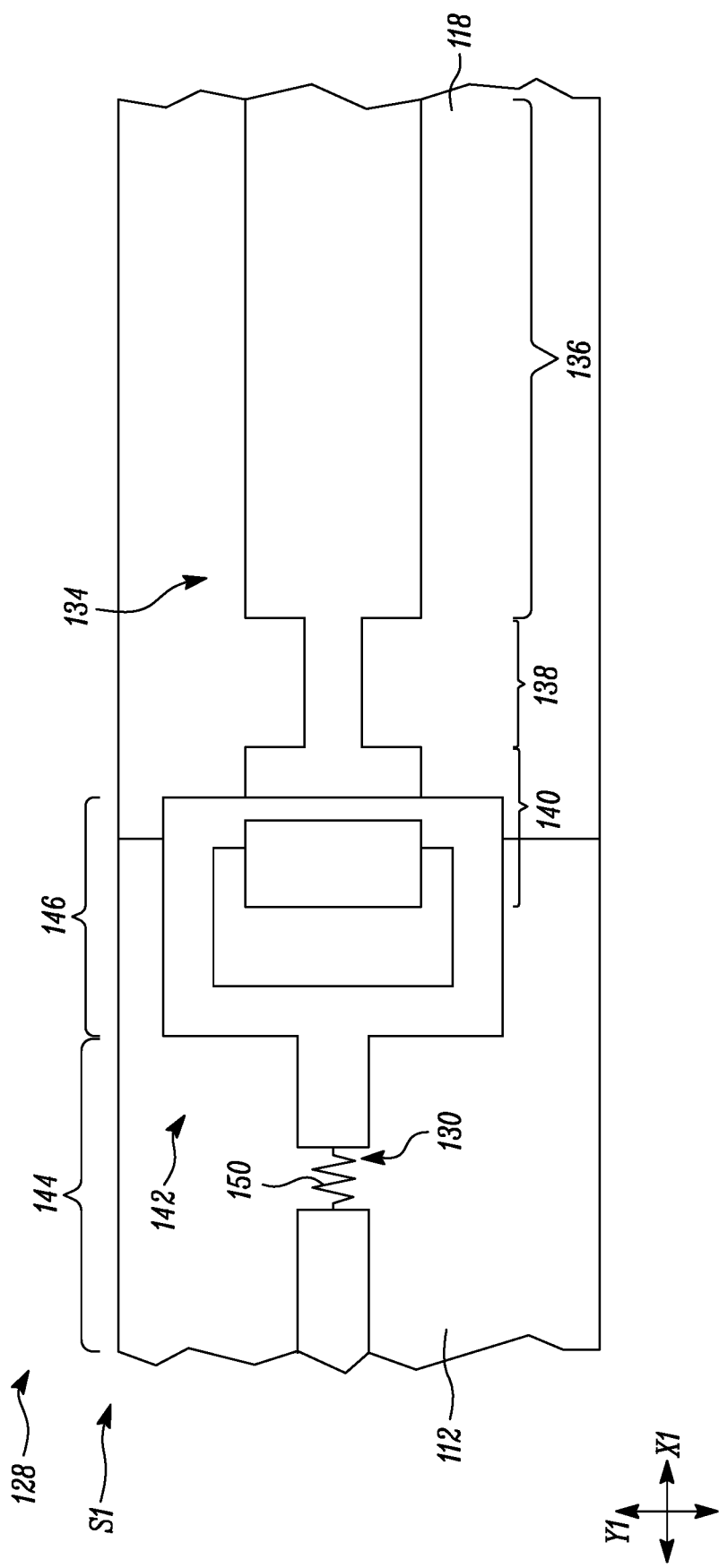
FIG. 12 is a schematic bottom view of the latch in the normal mode, according to another embodiment of the present disclosure.

FIG. 12 is a schematic bottom view of the latch 128 in the normal mode S1, according to another embodiment of the present disclosure. In the illustrated embodiment of FIG. 12, the latch keeper 142 includes the at least one pressure relief component 130. Specifically, the attachment section 144 of the latch keeper 142 includes the at least one pressure relief component 130. More specifically, the at least one pressure relief component 130 includes the spring 150. Referring now to FIGS. 5C and 12, in some embodiments, in the failure mode S3, the spring 150 deforms to cause the at least one of the first cowl member 112 and the second cowl member 118 to move relative to the engine core 11 (shown in FIGS. 3A and 3B).

Therefore, when the spring 150 expands or deforms upon application of the threshold load, the other of the first cowl member 112 and the second cowl member 118 moves relative to the engine core 11, thereby forming the opening 132 between the first cowl member 112 and the second cowl member 118.

Figure 13B:
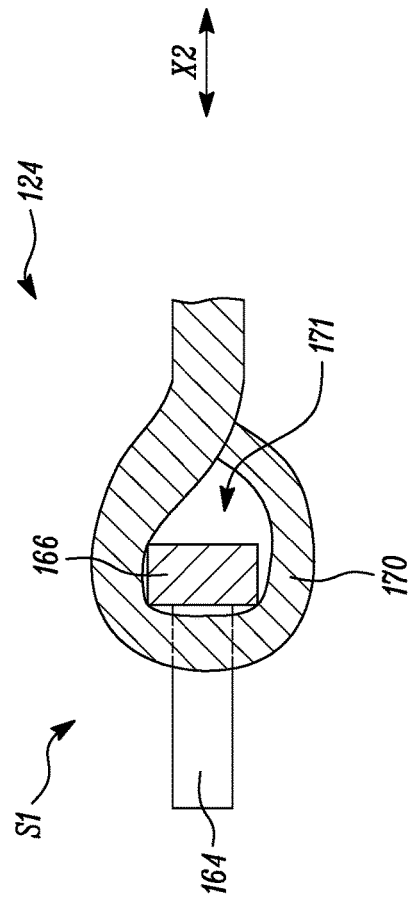
FIG. 13B is a partial schematic sectional side view of the first hinge in the normal mode, according to an embodiment of the present disclosure.

FIG. 13A is a schematic top view of the first hinge 124 in the normal mode S1, according to an embodiment of the present disclosure. FIG. 13B is a partial schematic sectional side view of the first hinge 124 in the normal mode S1, according to an embodiment of the present disclosure.

Referring now to FIGS. 4A, 13A, and 13B, in some embodiments, the first hinge 124 includes a first hinge body 162 fixedly connected to one of the first cowl member 112 and the mounting structure 106. In some embodiments, the first hinge 124 further includes a first hinge clevis 164 fixedly connected to the other of the first cowl member 112 and the mounting structure 106. In some embodiments, the first hinge body 162 includes a first body section 168 fixedly attached to the one of the first cowl member 112 and the mounting structure 106.

In the illustrated embodiment of FIGS. 13A and 13B, the first hinge body 162 is fixedly connected to the mounting structure 106 and the first hinge clevis 164 is fixedly connected to the first cowl member 112. Specifically, the first body section 168 is fixedly attached to the mounting structure 106. However, in some other embodiments, the first hinge body 162 may be fixedly connected to the first cowl member 112 and the first hinge clevis 164 may be fixedly connected to the mounting structure 106.

In some embodiments, the first hinge body 162 further includes a first loop section 170 extending from the first body section 168 along a longitudinal axis X2. In some embodiments, the first hinge 124 further includes a first hinge pin 166 pivotally connecting the first hinge clevis 164 to the first hinge body 162. Specifically, the first loop section 170 defines a first through-hole 171 (shown in FIG. 13B) at least partially receiving the first hinge pin 166 therethrough along a transverse axis Y2 orthogonal to the longitudinal axis X2 to pivotally connect the first hinge clevis 164 to the first hinge body 162. Thus, the first hinge pin 166 may allow the first cowl member 112 to pivot relative to the mounting structure 106.

Figure 14B:
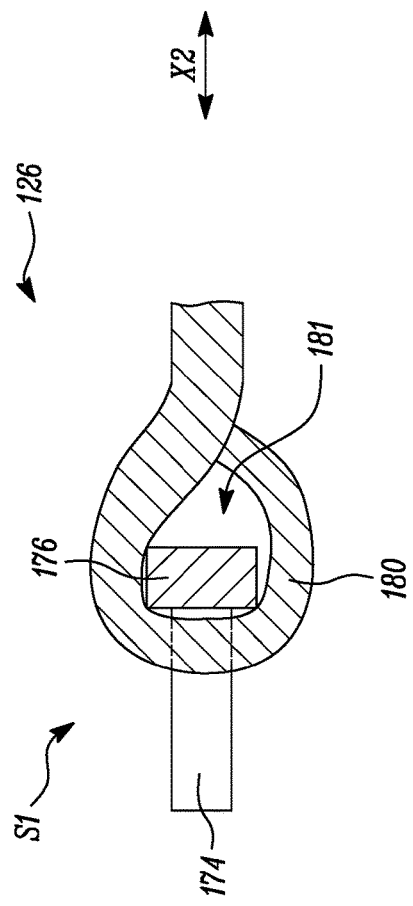
FIG. 14B is a partial schematic sectional side view of the second hinge in the normal mode, according to an embodiment of the present disclosure.

FIG. 14A is a schematic top view of the second hinge 126 in the normal mode S1, according to an embodiment of the present disclosure. FIG. 14B is a partial schematic sectional side view of the second hinge 126 in the normal mode S1, according to an embodiment of the present disclosure.

Referring now to FIGS. 4A, 14A, and 14B, in some embodiments, the second hinge 126 includes a second hinge body 172 fixedly connected to one of the second cowl member 118 and the mounting structure 106. In some embodiments, the second hinge 126 further includes a second hinge clevis 174 fixedly connected to the other of the second cowl member 118 and the mounting structure 106. In some embodiments, the second hinge body 172 includes a second body section 178 fixedly attached to the one of the second cowl member 118 and the mounting structure 106.

In the illustrated embodiment of FIGS. 14A and 14B, the second hinge body 172 is fixedly connected to the second cowl member 118 and the second hinge clevis 174 is fixedly connected to the mounting structure 106. Specifically, the second body section 178 is fixedly attached to the second cowl member 118. However, in some other embodiments, the second hinge body 172 may be fixedly connected to the mounting structure 106 and the second hinge clevis 174 may be fixedly connected to the second cowl member 118.

In some embodiments, the second hinge body 172 further includes a second loop section 180 extending from the second body section 178 along the longitudinal axis X2. In some embodiments, the second hinge 126 further includes a second hinge pin 176 pivotally connecting the second hinge clevis 174 to the second hinge body 172. Specifically, the second loop section 180 defines a second through-hole 181 (shown in FIG. 14B) at least partially receiving the second hinge pin 176 therethrough along the transverse axis Y2 orthogonal to the longitudinal axis X2 to pivotally connect the second hinge clevis 174 to the second hinge body 172. Thus, the second hinge pin 176 may allow the second cowl member 118 to pivot relative to the mounting structure 106.

FIG. 15 is a schematic top view of the first hinge 124 or the second hinge 126 in the normal mode S1, according to another embodiment of the present disclosure. Referring now to FIGS. 5A, 5B, 13A, 14A, and 15, in some embodiments, at least one of the first hinge body 162, the second hinge body 172, the first hinge pin 166, and the second hinge pin 176 includes the at least one pressure relief component 130.

In the illustrated embodiment of FIG. 13A, the first hinge body 162 includes the at least one pressure relief component 130. Specifically, the first body section 168 includes the at least one pressure relief component 130. In the illustrated embodiment of FIG. 14A, the second hinge body 172 includes the at least one pressure relief component 130. Specifically, the second body section 178 includes the at least one pressure relief component 130. In the illustrated embodiment of FIG. 15, the first hinge pin 166 and/or the second hinge pin 176 includes the at least one pressure relief component 130. In the illustrated embodiments of FIGS. 13A, 14A, and 15, the at least one pressure relief component 130 includes the breakable portion 148 defining a minimum width W6, W7, W8, W9 of the corresponding first body section 168, the second body section 178, the first hinge pin 166, and the second hinge pin 176. Specifically, in the illustrated embodiment of FIG. 13A, the at least one pressure relief component 130 includes the breakable portion 148 defining the minimum width W6 of the first body section 168. In the illustrated embodiment of FIG. 14A, the at least one pressure relief component 130 includes the breakable portion 148 defining the minimum width W7 of the second body section 178. Further, in the illustrated embodiment of FIG. 15, the at least one pressure relief component 130 includes the breakable portion 148 defining the minimum width W8, W9 of the corresponding the first hinge pin 166 and the second hinge pin 176.

In some embodiments, in the failure mode S3 (shown in FIGS. 5A and 5B), the at least one pressure relief component 130 at least partially deforms or breaks to cause at least one of the first cowl member 112 and the second cowl member 118 to detach from the mounting structure 106, thereby forming the at least one opening 132 between the mounting structure 106 and the at least one of the first cowl member 112 (shown in FIG. 5A) and the second cowl member 118 (shown in FIG. 5B). Specifically, in the illustrated embodiments of FIGS. 13A, 14A, and 15, in the failure mode S3, the breakable portion 148 breaks to cause at least one of the first cowl member 112 and the second cowl member 118 to detach from the mounting structure 106.

In some embodiments, the breakable portion 148 breaks upon application of the threshold load, thereby forming the opening 132 between the mounting structure 106 and the at least one of the first cowl member 112 (shown in FIG. 5A) and the second cowl member 118 (shown in FIG. 5B).

In the illustrated embodiment of FIGS. 5A and 13A, the breakable portion 148 breaks to cause the first cowl member 112 to move relative to the engine core 11. Therefore, when the breakable portion 148 breaks upon application of the threshold load, the first loop section 170 of the first hinge body 162 detaches from the one of the first cowl member 112 and the mounting structure 106. This causes the first cowl member 112 to move relative to the engine core 11, thereby forming the opening 132 between the first cowl member 112 and the mounting structure 106.

In the illustrated embodiment of FIGS. 5B and 14A, the breakable portion 148 breaks to cause the second cowl member 118 to move relative to the engine core 11. Therefore, when the breakable portion 148 breaks upon application of the threshold load, the second loop section 180 of the second hinge body 172 detaches from the one of the second cowl member 118 and the mounting structure 106. This causes the second cowl member 118 to move relative to the engine core 11, thereby forming the opening 132 between the second cowl member 118 and the mounting structure 106.

In the illustrated embodiment of FIG. 15, the breakable portion 148 breaks to cause the first cowl member 112 or the second cowl member 118 to move relative to the engine core 11. Therefore, when the breakable portion 148 of the first hinge pin 166 breaks upon application of the threshold load, the first cowl member 112 detaches from the mounting structure 106. This causes the first cowl member 112 to move relative to the engine core 11, thereby forming the opening 132 between the first cowl member 112 and the mounting structure 106. Similarly, when the breakable portion 148 of the second hinge pin 176 breaks upon application of the threshold load, the second cowl member 118 detaches from the mounting structure 106. This causes the second cowl member 118 to move relative to the engine core 11, thereby forming the opening 132 between the second cowl member 118 and the mounting structure 106.

Figure 16:
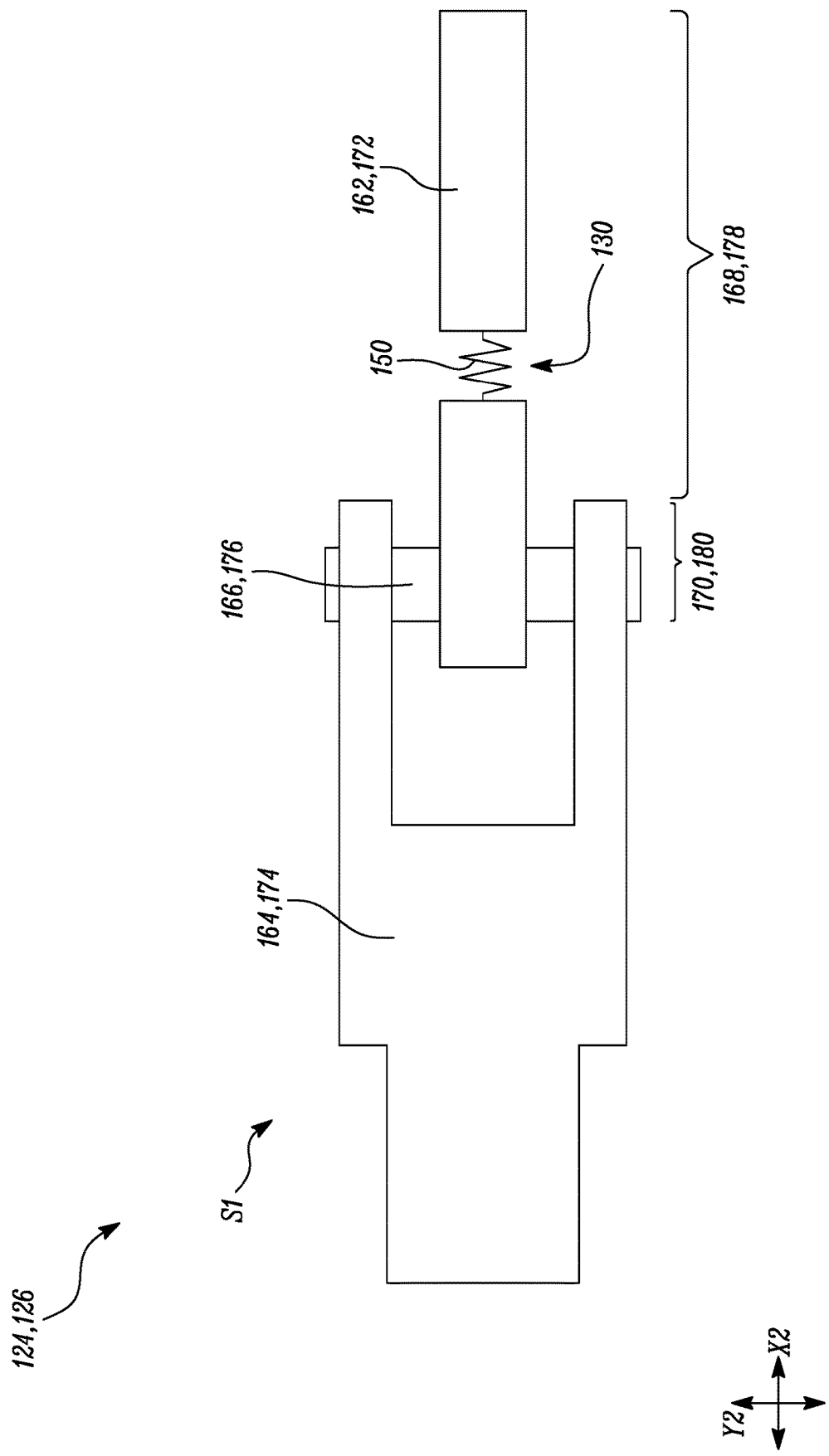
FIG. 16 is a schematic top view of the first hinge or the second hinge in the normal mode, according to another embodiment of the present disclosure.

FIG. 16 is a schematic top view of the first hinge 124 or the second hinge 126 in the normal mode S1, according to another embodiment of the present disclosure. In the illustrated embodiment of FIG. 16, the first hinge body 162 or the second hinge body 172 includes the at least one pressure relief component 130. Further, in the illustrated embodiment of FIG. 16, the at least one pressure relief component 130 includes the spring 150. In some embodiments, in the failure mode S3 (shown in FIGS. 5A and 5B), the spring 150 deforms to cause the first cowl member 112 or the second cowl member 118 to move relative to the engine core 11 (shown in FIGS. 3A and 3B). Therefore, when the spring 150 of the first body section 162 deforms upon application of the threshold load, the first cowl member 112 moves relative to the mounting structure 106, thereby forming the opening 132 between the first cowl member 112 and the mounting structure 106. Similarly, when the spring 150 of the second body section 172 deforms upon application of the threshold load, the second cowl member 118 moves relative to the mounting structure 106, thereby forming the opening 132 between the second cowl member 118 and the mounting structure 106.

Figure 17A:
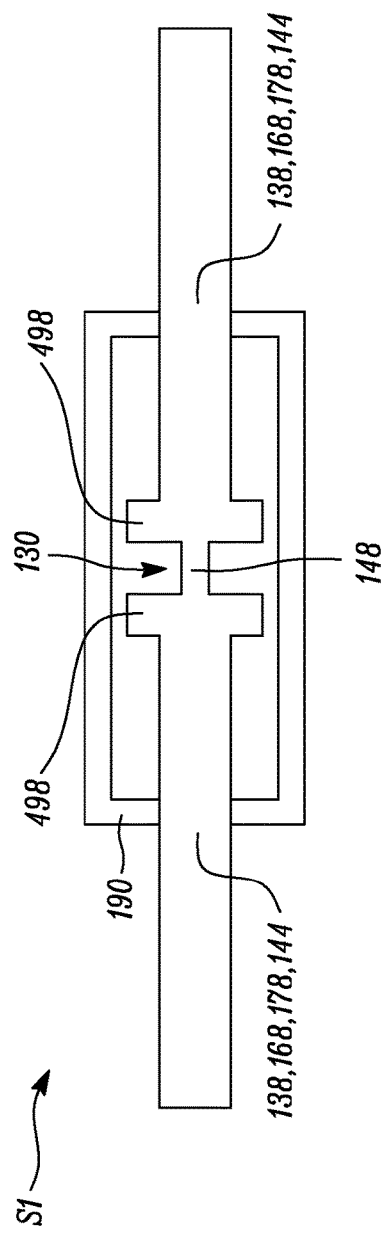
FIGS. 17A and 17B are partial schematic sectional side views of at least one pressure relief component and a displacement limiter in the normal mode and the failure mode, respectively, according to an embodiment of the present disclosure.
Figure 17B:
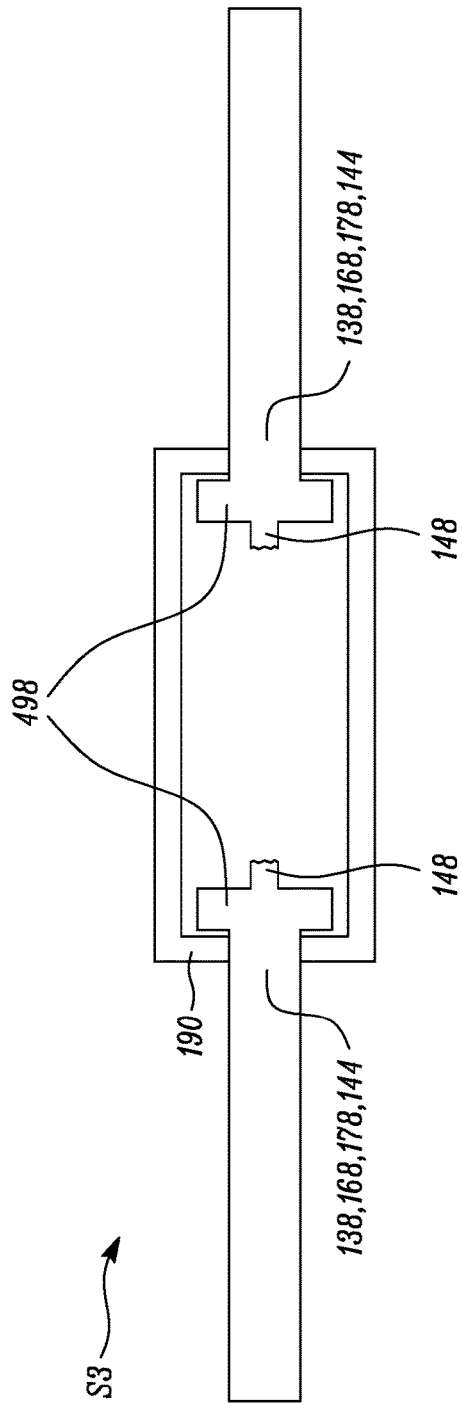

FIGS. 17A and 17B are partial schematic sectional side views of the at least one pressure relief component 130 and a displacement limiter 190 in the normal mode S1 and the failure mode S3, respectively. In some embodiments, the inner cowl arrangement 110 (shown in FIGS. 4A-5B) further includes the displacement limiter 190 surrounding the at least one pressure relief component 130.

Referring now to FIGS. 5C, 7A, and 17A-17B, in some embodiments, the neck section 138 includes one or more flanges 498. Specifically, the one or more flanges 498 are disposed on either side of the breakable portion 148. Further, the one or more flanges 498 are disposed within the displacement limiter 190. In such embodiments, in the failure mode S3, the displacement limiter 190 is configured to engage the one or more flanges 498 of the neck section 138 to prevent detachment of the hook section 140 from the one of the first cowl member 112 and the second cowl member 118. Specifically, the displacement limiter 190 is configured to engage the one or more flanges 498 of the neck section 138 to prevent detachment of the hook section 140 from the second cowl member 118. Thus, the displacement limiter 190 may prevent detachment of the hook section 140 from the one of the first cowl member 112 and the second cowl member 118 by restricting the one or more flanges 498 within the displacement limiter 190. Additionally, the displacement limiter 190 may limit the movement of the first cowl member 112 and the second cowl member 118 to control a size of the opening 132.

Referring now to FIGS. 5C, 11, and 17A-17B, in some embodiments, the attachment section 144 includes the one or more flanges 498. Specifically, the one or more flanges 498 are disposed on either side of the breakable portion 148. Further, the one or more flanges 498 are disposed within the displacement limiter 190. In such embodiments, in the failure mode S3, the displacement limiter 190 is configured to engage the one or more flanges 498 of the attachment section 144 to prevent detachment of the keeper section 146 from the other of the first cowl member 112 and the second cowl member 118. Specifically, the displacement limiter 190 is configured to engage the one or more flanges 498 of the attachment section 144 to prevent detachment of the keeper section 146 from the first cowl member 112. Thus, the displacement limiter 190 may prevent detachment of the keeper section 146 from the first cowl member 112 by restricting the one or more flanges 498 within the displacement limiter 190. Additionally, the displacement limiter 190 may limit the movement of the first cowl member 112 and the second cowl member 118 to control a size of the opening 132.

Referring now to FIGS. 5A, 13A, and 17A-17B, in some embodiments, the first body section 168 includes the one or more flanges 498. Specifically, the one or more flanges 498 are disposed on either side of the breakable portion 148. Further, the one or more flanges 498 are disposed within the displacement limiter 190. In such embodiments, in the failure mode S3, the displacement limiter 190 is configured to engage the one or more flanges 498 of the first body section 168 to prevent detachment of the first loop section 170 from the one of the first cowl member 112 and the mounting structure 106. Specifically, the displacement limiter 190 is configured to engage the one or more flanges 498 of the first body section 168 to prevent detachment of the first loop section 170 from the mounting structure 106. Thus, the displacement limiter 190 may prevent detachment of the first loop section 170 from the mounting structure 106 by restricting the one or more flanges 498 within the displacement limiter 190. Additionally, the displacement limiter 190 may limit the movement of the first cowl member 112 to control a size of the opening 132.

Referring now to FIGS. 5B, 14A, and 17A-17B, in some embodiments, the second body section 178 includes one or more flanges 498. Specifically, the one or more flanges 498 are disposed on either side of the breakable portion 148. Further, the one or more flanges 498 are disposed within the displacement limiter 190. In such embodiments, in the failure mode S3, the displacement limiter 190 is configured to engage the one or more flanges 498 of the second body section 178 to prevent detachment of the second loop section 180 from the one of the second cowl member 118 and the mounting structure 106. Specifically, the displacement limiter 190 is configured to engage the one or more flanges 498 of the second body section 178 to prevent detachment of the second loop section 180 from the second cowl member 118. Thus, the displacement limiter 190 may prevent detachment of the second loop section 180 from the second cowl member 118 by restricting the one or more flanges 498 within the displacement limiter 190. Additionally, the displacement limiter 190 may limit the movement of the second cowl member 118 to control a size of the opening 132.

Referring now to FIGS. 1-17B, the at least one pressure relief component 130 may eliminate the need for conventional latched doors to be integrated into the gas turbine engine 10. Moreover, the proposed solution may be lighter than conventional pressure relief arrangements and may also facilitate integration into the gas turbine engine 10 as compared to the conventional pressure relief arrangements. Further, the at least one pressure relief component 130 may allow use of stiffer or stronger materials for the inner cowl arrangement 110 of the gas turbine engine 10. Additionally, the at least one pressure relief component 130 may allow use of gas turbine engine architectures with different inner cowl arrangement 110 and outer cowl arrangement (or the cowls 108). Therefore, the at least one pressure relief component 130 may allow improved management of the pressure P1 within the engine core 11 resulting from the burst duct event for future gas turbine engine architectures.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An inner cowl arrangement for a gas turbine engine having an engine core, the inner cowl arrangement surrounding the engine core and attached to a mounting structure, the inner cowl arrangement comprising:

a first cowl member comprising a first upper edge and a first lower edge;

a first hinge pivotally connecting the first cowl member to the mounting structure proximal to the first upper edge;

a second cowl member opposing the first cowl member and comprising a second upper edge and a second lower edge;

a second hinge pivotally connecting the second cowl member to the mounting structure proximal to the second upper edge; and a latch detachably securing the first lower edge of the first cowl member to the second lower edge of the second cowl member, the latch including at least one pressure relief component configured to receive an applied load due to a pressure within the engine core, the latch including two flanges, each flange located on an opposite side of the pressure relief component from the other flange;

wherein:

a displacement limiter surrounds the at least one pressure relief component, each of the two flanges being movable within the displacement limiter when the pressure relief component at least partially deforms or breaks;

in a normal mode, the applied load on the at least one pressure relief component is less than or equal to a normal operating load, and the first cowl member and the second cowl member together retain the pressure within the engine core;

in a failure mode, when the applied load on the at least one pressure relief component is greater the normal operating load:

the at least one pressure relief component at least partially deforms or breaks to cause at least one of the first cowl member and the second cowl member to move relative to the engine core;

the displacement limiter is configured to engage the two flanges to prevent detachment of the latch from the one of the first cowl member and the second cowl member; and a movement of the at least one of the first cowl member and the second cowl member relative to the engine core forms at least one opening to relieve at least a portion of the pressure from the engine core.

2. The inner cowl arrangement of claim 1, wherein the latch comprises:

a latch body fixedly connected to one of the first cowl member and the second cowl member; and a latch keeper fixedly connected to the other of the first cowl member and the second cowl member, wherein the latch keeper removably engages with the latch body to detachably secure the first cowl member to the second cowl member;

wherein at least one of the latch body and the latch keeper comprises the at least one pressure relief component; and wherein, in the failure mode, the at least one pressure relief component at least partially deforms or breaks to cause the first cowl member to detach from the second cowl member, thereby forming the at least one opening between the first cowl member and the second cowl member.

3. The inner cowl arrangement of claim 2, wherein the latch body comprises:

a body section fixedly connected to the one of the first cowl member and the second cowl member;

a neck section extending from the body section toward the other of the first cowl member and the second cowl member along a longitudinal axis, the neck section comprising the at least one pressure relief component; and a hook section extending from the neck section along the longitudinal axis, wherein the hook section removably engages with the latch keeper to detachably secure the first cowl member to the second cowl member;

wherein a maximum width of the neck section is less than a minimum width of each of the body section and the hook section, and wherein each of the maximum width and the minimum width is along a transverse axis orthogonal to the longitudinal axis.

4. The inner cowl arrangement of claim 3, wherein the at least one pressure relief component comprises a breakable portion defining a minimum width of the corresponding at least one of the neck section, at least one latch pin, an attachment section, a first body section, a second body section, the first hinge pin, and the second hinge pin, and wherein, in the failure mode, the breakable portion breaks to cause the at least one of the first cowl member and the second cowl member to move relative to the engine core.

5. The inner cowl arrangement of claim 2, wherein the latch body comprises:

a body section comprising at least one latch pin fixedly connected to the one of the first cowl member and the second cowl member and extending along a transverse axis, the at least one latch pin comprising the at least one pressure relief component;

a neck section extending from the body section toward the other of the first cowl member and the second cowl member along a longitudinal axis orthogonal to the transverse axis; and a hook section extending from the neck section along the longitudinal axis, wherein the hook section removably engages with the latch keeper to detachably secure the first cowl member to the second cowl member;

wherein a maximum width of the neck section is less than a minimum width of each of the body section and the hook section, and wherein each of the maximum width and the minimum width is along the transverse axis.

6. The inner cowl arrangement of claim 2, wherein the latch body comprises the at least one pressure relief component, the latch body further comprising:

a body section comprising at least one latch pin fixedly extending along a transverse axis;

a mounting section spaced apart from the body section and fixedly connected to the one of the first cowl member and the second cowl member;

a neck section extending from the body section toward the other of the first cowl member and the second cowl member along a longitudinal axis orthogonal to the transverse axis; and a hook section extending from the neck section along the longitudinal axis, wherein the hook section removably engages with the latch keeper to detachably secure the first cowl member to the second cowl member;

wherein a maximum width of the neck section is less than a minimum width of each of the body section and the hook section, wherein each of the maximum width and the minimum width is along the transverse axis, and wherein the at least one pressure relief component connects the at least one latch pin to the mounting section.

7. The inner cowl arrangement of claim 2, wherein the latch keeper comprises:

an attachment section fixedly connected to the other of the first cowl member and the second cowl member, the attachment section comprising the at least one pressure relief component; and a keeper section extending from the attachment section along a longitudinal axis, wherein the keeper section removably engages with the latch body to detachably secure the first cowl member to the second cowl member.

8. The inner cowl arrangement of claim 2, wherein the at least one pressure relief component comprises a spring, and wherein, in the failure mode, the spring deforms to cause the at least one of the first cowl member and the second cowl member to move relative to the engine core.

9. The inner cowl arrangement of claim 1, wherein the first hinge comprises:
   a first hinge body fixedly connected to one of the first cowl member and the mounting structure;
   a first hinge clevis fixedly connected to the other of the first cowl member and the mounting structure; and
   a first hinge pin pivotally connecting the first hinge clevis to the first hinge body; and
   wherein the second hinge comprises:
   a second hinge body fixedly connected to one of the second cowl member and the mounting structure;
   a second hinge clevis fixedly connected to the other of the second cowl member and the mounting structure; and
   a second hinge pin pivotally connecting the second hinge clevis to the second hinge body;
   wherein at least one of the first hinge body, the second hinge body, the first hinge pin, and the second hinge pin comprises the at least one pressure relief component; and
   wherein, in the failure mode, the at least one pressure relief component at least partially deforms or breaks to cause at least one of the first cowl member and the second cowl member to detach from the mounting structure, thereby forming the at least one opening between the mounting structure and the at least one of the first cowl member and the second cowl member.

10. The inner cowl arrangement of claim 9, wherein the first hinge body comprises:
    a first body section fixedly attached to the one of the first cowl member and the mounting structure, the first body section comprising the at least one pressure relief component; and
    a first loop section extending from the first body section along a longitudinal axis, the first loop section defining a first through-hole at least partially receiving the first hinge pin therethrough along a transverse axis orthogonal to the longitudinal axis to pivotally connect the first hinge clevis to the first hinge body.

11. The inner cowl arrangement of claim 9, wherein the second hinge body comprises:
    a second body section fixedly attached to the one of the second cowl member and the mounting structure, the second body section comprising the at least one pressure relief component; and
    a second loop section extending from the second body section along a longitudinal axis, the second loop section defining a second through-hole at least partially receiving the second hinge pin therethrough along a transverse axis orthogonal to the longitudinal axis to pivotally connect the second hinge clevis to the second hinge body.

12. The inner cowl arrangement of claim 1, wherein in the failure mode, the applied load on the at least one pressure relief component is greater the normal operating load by a factor of at least 1.5.

13. A gas turbine engine comprising: the engine core comprising a compressor, a combustor, a turbine, and a core shaft connecting the turbine to the compressor; and the inner cowl arrangement of claim 1 surrounding the engine core.

14. An aircraft comprising a fuselage; a wing extending from the fuselage; the gas turbine engine of claim 13; and the mounting structure for attaching the gas turbine engine to the wing, wherein the inner cowl arrangement is attached to the mounting structure.

* * * * *